US012100557B2

(12) United States Patent
Takata et al.

(10) Patent No.: US 12,100,557 B2
(45) Date of Patent: Sep. 24, 2024

(54) ELECTRONIC COMPONENT

(71) Applicant: TDK CORPORATION, Tokyo (JP)

(72) Inventors: Kyohei Takata, Tokyo (JP); Shinya Onodera, Tokyo (JP); Ken Morita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/946,630

(22) Filed: Sep. 16, 2022

(65) Prior Publication Data

US 2023/0154683 A1 May 18, 2023

(30) Foreign Application Priority Data

Nov. 15, 2021 (JP) ................. 2021-185391

(51) Int. Cl.
*H01G 4/232* (2006.01)
*H01G 4/08* (2006.01)
*H01G 4/248* (2006.01)
*H01G 4/30* (2006.01)

(52) U.S. Cl.
CPC ............. *H01G 4/2325* (2013.01); *H01G 4/08* (2013.01); *H01G 4/248* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 5,339,068 A * | 8/1994 | Tsunoda | ................. | H01C 1/142 338/308 |
| 8,058,968 B2 * | 11/2011 | Hirano | ................. | H01C 17/006 338/332 |
| 9,064,623 B2 * | 6/2015 | Shirakawa | ............. | H01C 1/148 |
| 9,659,713 B2 * | 5/2017 | Shirakawa | ............... | H01G 4/12 |
| 10,366,834 B1 * | 7/2019 | Lee | ...................... | H01G 4/1209 |
| 11,011,294 B2 * | 5/2021 | Sato | ...................... | H01F 27/292 |
| 11,227,721 B2 * | 1/2022 | Tozawa | ............... | H01G 13/006 |
| 11,476,049 B2 * | 10/2022 | Sakurai | ................. | H01G 4/012 |
| 11,694,843 B2 * | 7/2023 | Kang | ..................... | H01G 4/248 361/301.4 |
| 2009/0191418 A1 * | 7/2009 | Nakano | ..................... | H01C 7/18 428/469 |
| 2010/0290172 A1 * | 11/2010 | Motoki | ............... | H01G 4/2325 427/79 |
| 2010/0302704 A1 * | 12/2010 | Ogawa | ................. | H01G 4/2325 361/306.3 |
| 2017/0256359 A1 * | 9/2017 | Masunari | ............... | H01G 4/005 |
| 2017/0260046 A1 * | 9/2017 | Hwang | ................ | H05K 3/3442 |

(Continued)

FOREIGN PATENT DOCUMENTS

CN 107331508 A * 11/2017 ......... H01F 17/0013
JP 2018-006501 A 1/2018

(Continued)

*Primary Examiner* — Dion R. Ferguson
(74) *Attorney, Agent, or Firm* — Oliff PLC

(57) ABSTRACT

An electronic component includes an element body, a plurality of external electrodes on the element body, and an electrical insulator on the element body. Each of the plurality of external electrodes includes a conductive resin layer. The electrical insulator includes an electrical insulating portion located at least on a region between the plurality of external electrodes on a surface of the element body.

31 Claims, 10 Drawing Sheets

(56) References Cited

U.S. PATENT DOCUMENTS

| | | | | |
|---|---|---|---|---|
| 2017/0330673 A1* | 11/2017 | Sato | ................... | H01F 27/2804 |
| 2018/0162780 A1* | 6/2018 | Kaneda | ............... | C22C 32/0026 |
| 2019/0103224 A1* | 4/2019 | Han | .................... | H01G 4/2325 |
| 2019/0103225 A1* | 4/2019 | Han | .................... | H01G 4/2325 |
| 2020/0152382 A1* | 5/2020 | Sakurai | ................. | H01G 4/248 |
| 2020/0161051 A1* | 5/2020 | Tanaka | .................. | H01G 4/232 |
| 2021/0065986 A1* | 3/2021 | Kim | ....................... | H01G 4/012 |
| 2021/0065988 A1* | 3/2021 | Kim | ....................... | H01G 4/012 |
| 2021/0082622 A1* | 3/2021 | Kim | ........................ | H01G 4/30 |
| 2021/0193391 A1* | 6/2021 | Yi | ....................... | H01G 4/1218 |
| 2022/0044872 A1* | 2/2022 | Kim | ....................... | H01G 4/232 |
| 2022/0139616 A1* | 5/2022 | Kang | ..................... | H01G 4/248 |
| | | | | 361/301.4 |
| 2022/0208474 A1* | 6/2022 | Onodera | ................ | H01G 4/232 |
| 2023/0154683 A1* | 5/2023 | Takata | ..................... | H01G 4/30 |
| | | | | 361/301.4 |

FOREIGN PATENT DOCUMENTS

| | | | | | |
|---|---|---|---|---|---|
| JP | 2022040762 A | * | 3/2022 | ............ | H01G 4/008 |
| KR | 20230079891 A | * | 6/2023 | | |

* cited by examiner

Fig.8

| SAMPLE | $T_{OL}$ [μm] | $T_{E2a}$ [μm] | $L_{E2a}$ [μm] | $T_{E1a}$ [μm] | $T_{E1a}/T_{OL}$ | $T_{E1a}/T_{E2a}$ | $T_{E1a}/L_{E2a}$ | LENGTH OF MIGRATION [μm] |
|---|---|---|---|---|---|---|---|---|
| 1 | 200 | 30 | 250 | 0 | 0 | 0 | 0 | 980 |
| 2 | 200 | 30 | 250 | 0.0015 | $7.5 \times 10^{-6}$ | $5.0 \times 10^{-5}$ | $6.0 \times 10^{-6}$ | 740 |
| 3 | 200 | 30 | 250 | 0.005 | $2.5 \times 10^{-5}$ | $1.67 \times 10^{-4}$ | $2.0 \times 10^{-5}$ | 613 |
| 4 | 200 | 30 | 250 | 0.01 | $5.0 \times 10^{-5}$ | $3.33 \times 10^{-4}$ | $4.0 \times 10^{-5}$ | 274 |
| 5 | 200 | 30 | 250 | 0.02 | $1.0 \times 10^{-4}$ | $6.67 \times 10^{-4}$ | $8.0 \times 10^{-5}$ | 62 |
| 6 | 200 | 30 | 250 | 0.05 | $2.5 \times 10^{-4}$ | $1.67 \times 10^{-3}$ | $2.0 \times 10^{-4}$ | 0 |
| 7 | 200 | 30 | 250 | 0.1 | $5.0 \times 10^{-4}$ | $3.33 \times 10^{-3}$ | $4.0 \times 10^{-4}$ | 0 |
| 8 | 200 | 30 | 250 | 0.15 | $7.5 \times 10^{-4}$ | $5.0 \times 10^{-3}$ | $6.0 \times 10^{-4}$ | 0 |
| 9 | 200 | 30 | 250 | 0.2 | $1.0 \times 10^{-3}$ | $6.67 \times 10^{-3}$ | $8.0 \times 10^{-4}$ | 0 |
| 10 | 200 | 30 | 250 | 0.5 | $2.5 \times 10^{-3}$ | $1.67 \times 10^{-2}$ | $2.0 \times 10^{-3}$ | 0 |

ELECTRONIC COMPONENT

BACKGROUND OF THE INVENTION

1. Field of the Invention

The present invention relates to an electronic component.

2. Description of Related Art

Known electronic components include an element body and a plurality of external electrodes on the element body (see, for example, Japanese Unexamined Patent Publication No. 2018-006501). Each of the plurality of external electrodes includes a conductive resin layer.

SUMMARY OF THE INVENTION

The conductive resin layer generally includes a plurality of metal particles and a resin. In a configuration in which the external electrode includes a conductive resin layer, migration may occur in the external electrode. Migration is considered to occur due to the following events, for example.

An electric field acts on the metal particle included in the conductive resin layer, and the metal particle is ionized. Generated metal ion is attracted by an electric field generated between the external electrodes and migrates from the conductive resin layer. The electric field acting on the metal particle includes, for example, an electric field generated between the external electrodes or an electric field generated between the external electrode and an internal conductor in the element body. The metal ion migrating from the conductive resin layer react with, for example, an electron supplied from the element body or the external electrode, and is deposited as metal on a surface of the element body.

An object of an aspect of the invention is to provide an electronic component controlling occurrence of migration even when an external electrode includes a conductive resin layer.

An electronic component according to one aspect of the invention includes an element body, a plurality of external electrodes on the element body, and an electrical insulator on the element body. Each of the plurality of external electrodes includes a conductive resin layer. The electrical insulator includes an electrical insulating portion located at least on a region between the plurality of external electrodes on a surface of the element body.

In the one aspect described above, the electrical insulating portion included in the electrical insulator is located at least on the region between the plurality of external electrodes on the surface of the element body. Therefore, even when a metal particle included in the conductive resin layer is ionized, the electrical insulating portion prevents the generated metal ion from reacting with an electron supplied from the element body or the external electrode. The electron tends not to be supplied to the metal ion. Consequently, the one aspect described above controls occurrence of migration.

The one aspect described above may further include a plurality of internal electrodes. The plurality of internal electrodes may be disposed in the element body to oppose each other. Each of the plurality of internal electrodes may be electrically connected to a corresponding external electrode of the plurality of external electrodes. The plurality of internal electrodes may include an outermost internal electrode located on an outermost side in a direction in which the plurality of internal electrodes oppose each other. The element body may include a first side surface opposing the outermost internal electrode. The conductive resin layer may include a portion located on the first side surface. The electrical insulating portion may be located on the first side surface.

In a configuration in which the conductive resin layer includes the portion located on the first side surface, the metal particle included in the portion included in the conductive resin layer and located on the first side surface may be ionized. However, in a configuration in which the electrical insulating portion included in the electrical insulator is located on the first side surface, the electrical insulating portion reliably prevents the metal ion generated from the metal particle included in the portion included in the conductive resin layer and located on the first side surface from reacting with the electron supplied from the element body or the external electrode. Consequently, the configuration in which the electrical insulating portion included in the electrical insulator is located on the first side surface reliably controls the occurrence of the migration.

In the one aspect described above, the element body may include a second side surface extending in the direction in which the plurality of internal electrodes oppose each other. The conductive resin layer may include a portion located on the second side surface. The electrical insulating portion may be located on the second side surface.

In a configuration in which the conductive resin layer includes the portion located on the second side surface, the metal particle included in the portion included in the conductive resin layer and located on the second side surface may be ionized. However, in a configuration in which the electrical insulating portion included in the electrical insulator is located on the second side surface, the electrical insulating portion reliably prevents the metal ion generated from the metal particle included in the portion included in the conductive resin layer and located on the second side surface from reacting with the electron supplied from the element body or the external electrode. Consequently, the configuration in which the electrical insulating portion included in the electrical insulator is located on the second side surface reliably controls the occurrence of the migration.

In the one aspect described above, the element body may include an end surface to which a corresponding internal electrode of the plurality of internal electrodes is exposed. The electrical insulator may include an electrical insulating portion located on the end surface.

In a configuration in which the external electrode includes an electrolytic plating layer, a plating solution may infiltrate into the element body. Infiltration of the plating solution into the element body may deteriorate electrical characteristics of the electronic component. However, in a configuration in which the electrical insulator includes the electrical insulating portion located on the end surface, even when the external electrode includes the electrolytic plating layer, the electrical insulating portion located on the end surface prevents the plating solution from infiltrating into the element body. Therefore, the configuration in which the electrical insulator includes the electrical insulating portion located on the end surface controls the deterioration of the electrical characteristics of the electronic component.

In the one aspect described above, each of the plurality of external electrodes may include a sintered metal layer disposed on the electrical insulator. The sintered metal layer may be physically and electrically connected to the corresponding internal electrode. The conductive resin layer may be disposed on the sintered metal layer.

In a configuration in which the sintered metal layer is disposed on the electrical insulator, even when the metal particle included in the conductive resin layer is ionized, the electron tends not to be supplied to the metal ion. Therefore, this configuration further controls the occurrence of the migration.

In the one aspect described above, an average thickness of the electrical insulating portion located on the first side surface may be equal to or greater than an average thickness of the electrical insulating portion located on the end surface.

In a configuration in which the average thickness of the electrical insulating portion located on the first side surface is equal to or greater than the average thickness of the electrical insulating portion located on the end surface, this configuration more reliably prevents the metal ion generated from the metal particle included in the portion included in the conductive resin layer and located on the first side surface from reacting with the electron supplied from the element body or the external electrode. Therefore, this configuration more reliably controls the occurrence of the migration.

In a configuration in which the electrical insulator includes the electrical insulating portion located on the end surface, this configuration may reduce connectivity between the sintered metal layer and the internal electrode corresponding to each other. However, in a configuration in which the average thickness of the electrical insulating portion located on the end surface is less than the average thickness of the electrical insulating portion located on the first side surface, this configuration prevents a decrease in connectivity between the sintered metal layer and the internal electrode corresponding to each other.

In the one aspect described above, the average thickness of the electrical insulating portion located on the first side surface may be 0.05 m or more.

In a configuration in which the average thickness of the electrical insulating portion located on the first side surface is 0.05 μm or more, this configuration reliably controls the occurrence of the migration.

In the one aspect described above, the average thickness of the electrical insulating portion located on the end surface may be greater than 0 and 0.2 μm or less.

In a configuration in which the average thickness of the electrical insulating portion located on the end surface is greater than 0 and 0.2 μm or less, this configuration reliably controls the deterioration of the electrical characteristics of the electronic component and the decrease in the connectivity between the sintered metal layer and the internal electrode corresponding to each other.

In the one aspect described above, a distance between the outermost internal electrode and the first side surface may be 100 μm or more and 400 μm or less.

In a configuration in which the distance between the outermost internal electrode and the first side surface is less than 100 μm, an electron tends to be supplied to a metal ion from the outermost internal electrode. Therefore, in a configuration in which the distance between the outermost internal electrode and the first side surface is 100 μm or more, the electron tends not to be supplied to the metal ion from the outermost internal electrode. Consequently, this configuration reliably controls the occurrence of the migration.

In a configuration in which the distance between the outermost internal electrode and the first side surface is greater than 400 μm, cracks tend to be generated in the element body. Therefore, in a configuration in which the distance between the outermost internal electrode and the first side surface is 400 μm or less, this configuration prevents cracks from being generated in the element body.

In the one aspect described above, the outermost internal electrode may be not electrically connected to the portion included in the conductive resin layer and located on the first side surface. The electrical insulating portion located on the first side surface may be located between the outermost internal electrode and the portion included in the conductive resin layer and located on the first side surface.

In a configuration in which the outermost internal electrode is not electrically connected to the portion included in the conductive resin layer and located on the first side surface, an electric field generated between the outermost internal electrode and the portion included in the conductive resin layer and located on the first side surface acts on the metal particle included in the conductive resin layer, so that the metal particle tends to be ionized. However, in a configuration in which the electrical insulating portion located on the first side surface is located between the outermost internal electrode and the portion included in the conductive resin layer and located on the first side surface, an electric field tends not to be generated between the outermost internal electrode and the portion included in the conductive resin layer and located on the first side surface. Therefore, this configuration further controls the occurrence of the migration.

In the one aspect described above, each of the plurality of external electrodes may include a plating layer disposed on the conductive resin layer to cover the conductive resin layer.

In a configuration in which the plating layer covers the conductive resin layer, the plating layer controls the occurrence of the migration even when the metal particle included in the conductive resin layer is ionized. Therefore, this configuration further controls the occurrence of the migration.

In a configuration in which the plating layer covers the conductive resin layer, the plating layer prevents the conductive resin layer from peeling off.

In the one aspect described above, the electrical insulator and the conductive resin layer may be in contact with each other.

In a configuration in which the electrical insulator and the conductive resin layer are in contact with each other, this configuration reliably prevents the electron from being supplied to the metal ion. Therefore, this configuration reliably controls the occurrence of the migration.

In the one aspect described above, the electrical insulator may include an electrical insulating thin film.

In the one aspect described above, the electrical insulator may include a silicon oxide film.

The silicon oxide film has a high electrical insulation property. Therefore, in a configuration in which the electrical insulator is silicon oxide film, this configuration reliably controls the occurrence of the migration.

In the one aspect described above, the conductive resin layer may include a plurality of silver particles.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 8 is a table illustrating occurrence of migration in each sample;

DETAILED DESCRIPTION OF EMBODIMENTS

Figure 1:
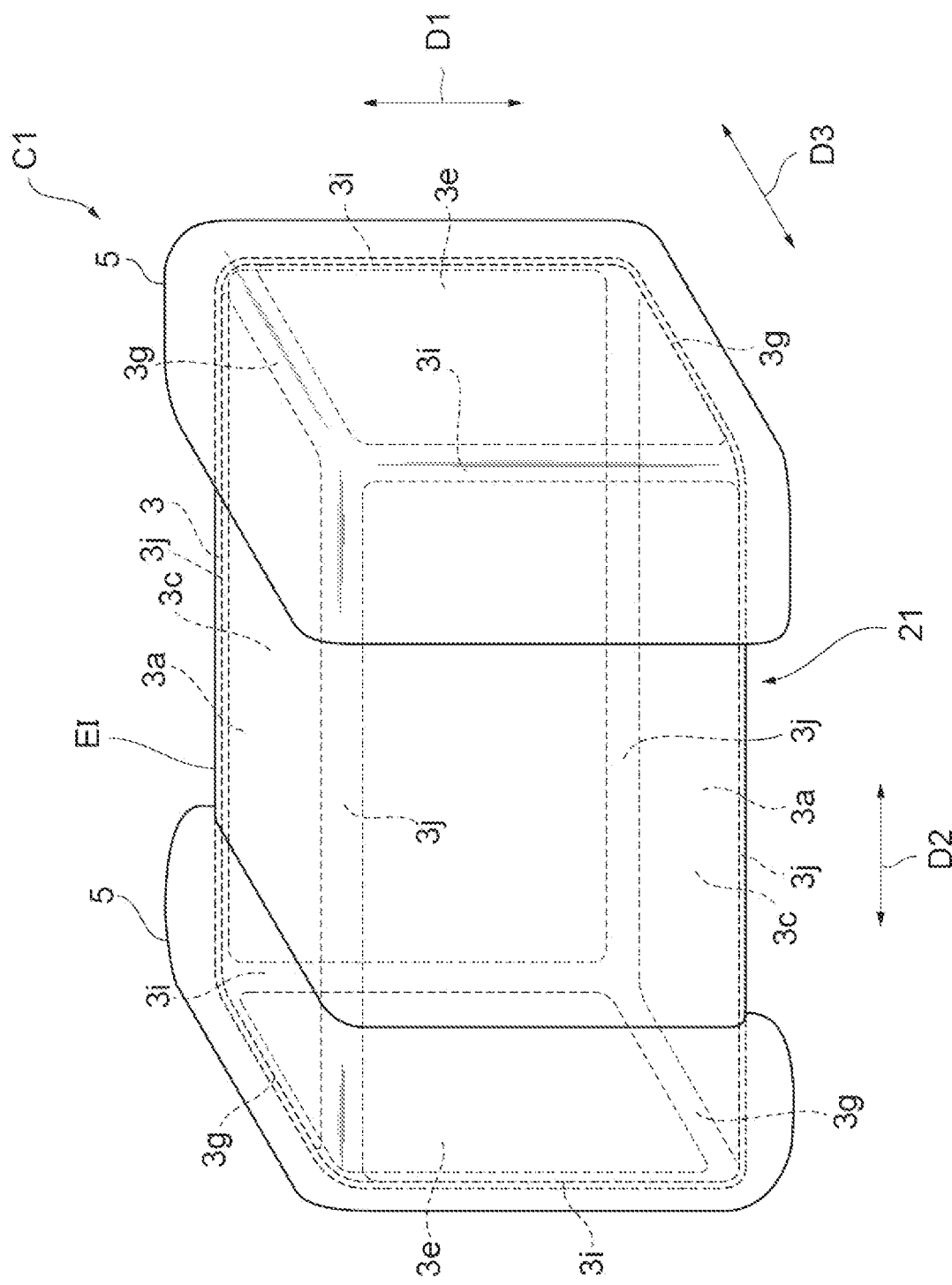
FIG. 1 is a perspective view of a multilayer capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
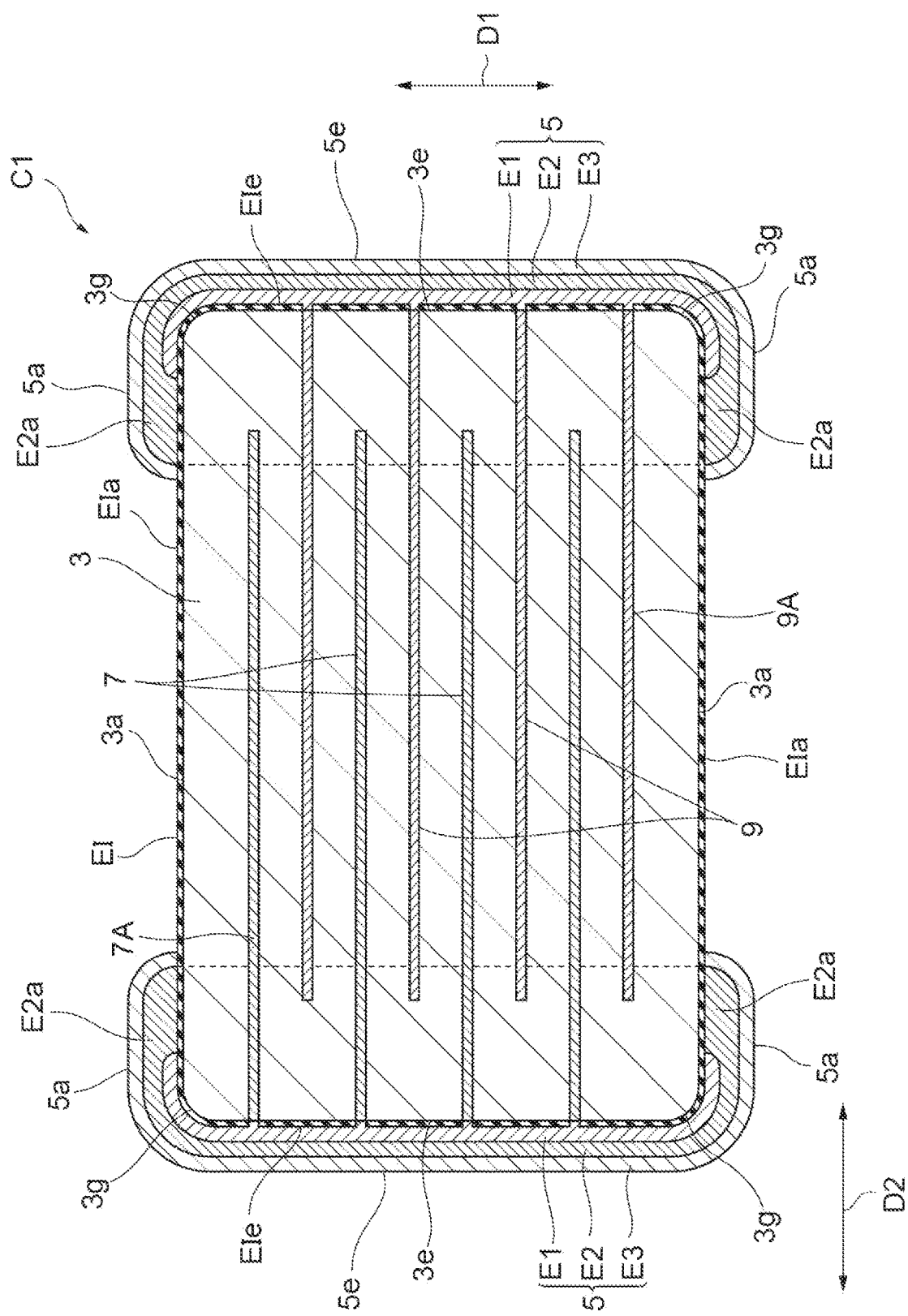
FIG. 2 is a view illustrating a cross-sectional configuration of the multilayer capacitor according to the embodiment.
Figure 3:
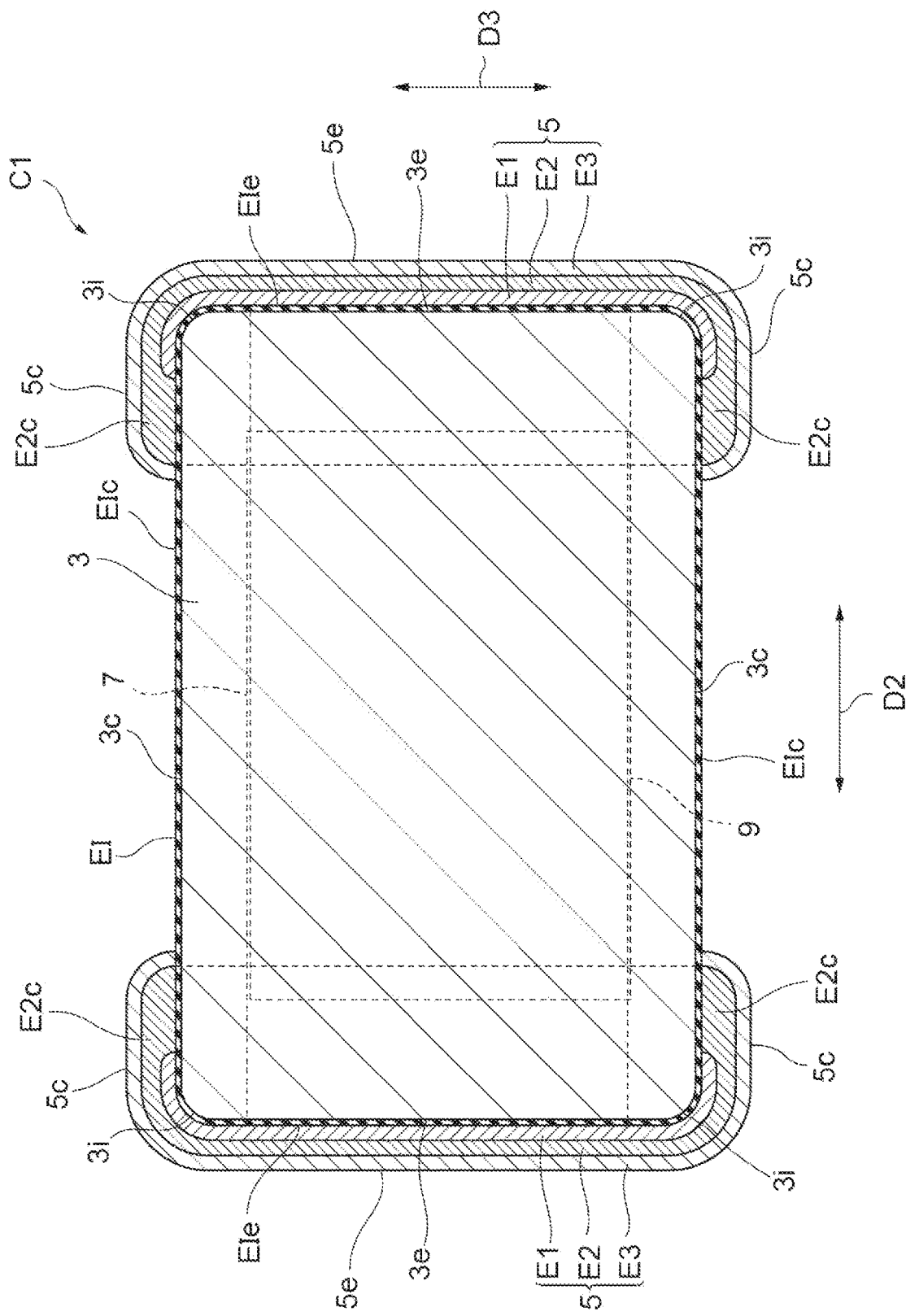
FIG. 3 is a view illustrating a cross-sectional configuration of the multilayer capacitor according to the embodiment.
Figure 4:
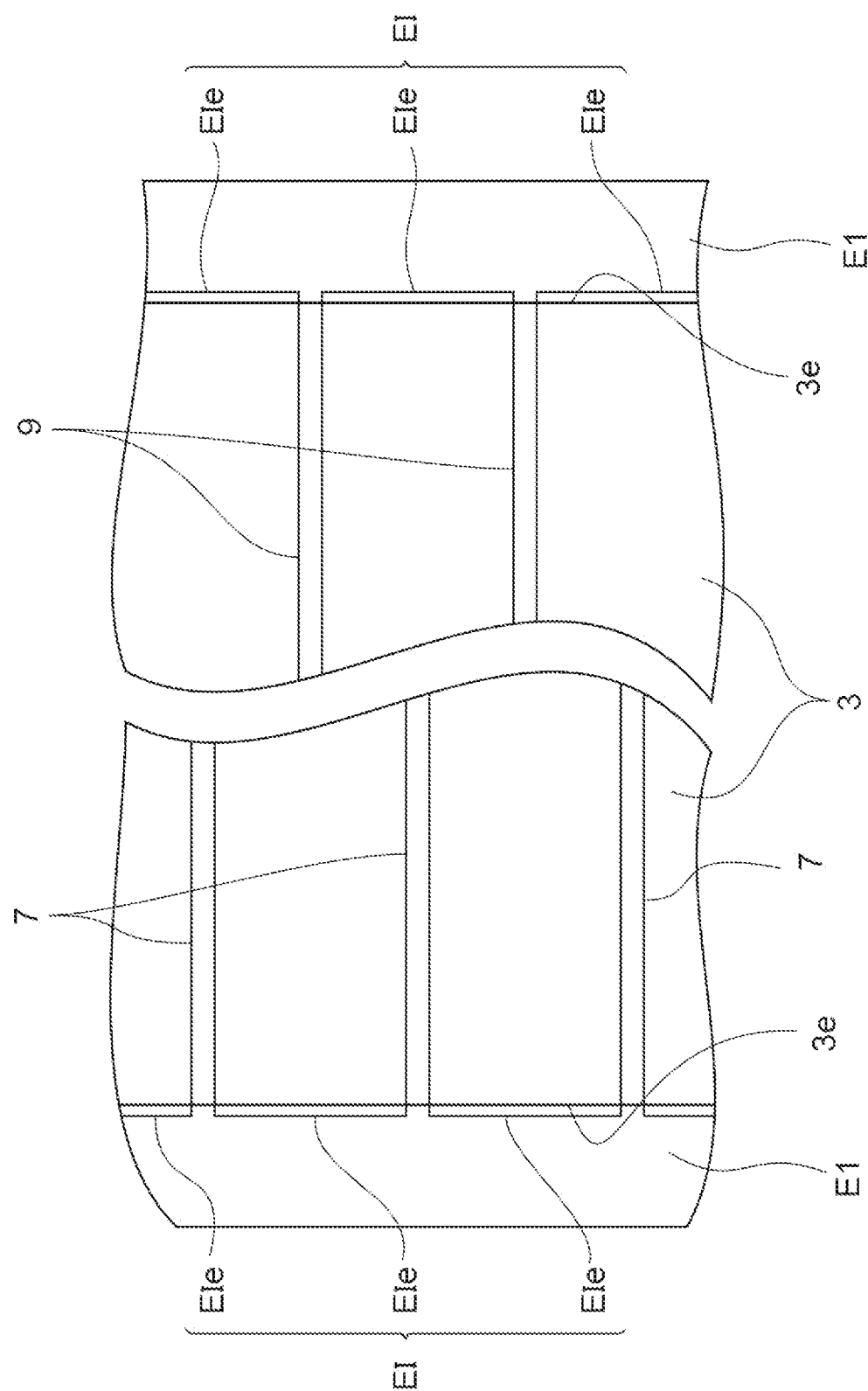
FIG. 4 is a schematic diagram illustrating an external electrode, an electrical insulating film, and an internal electrode.
Figure 5:
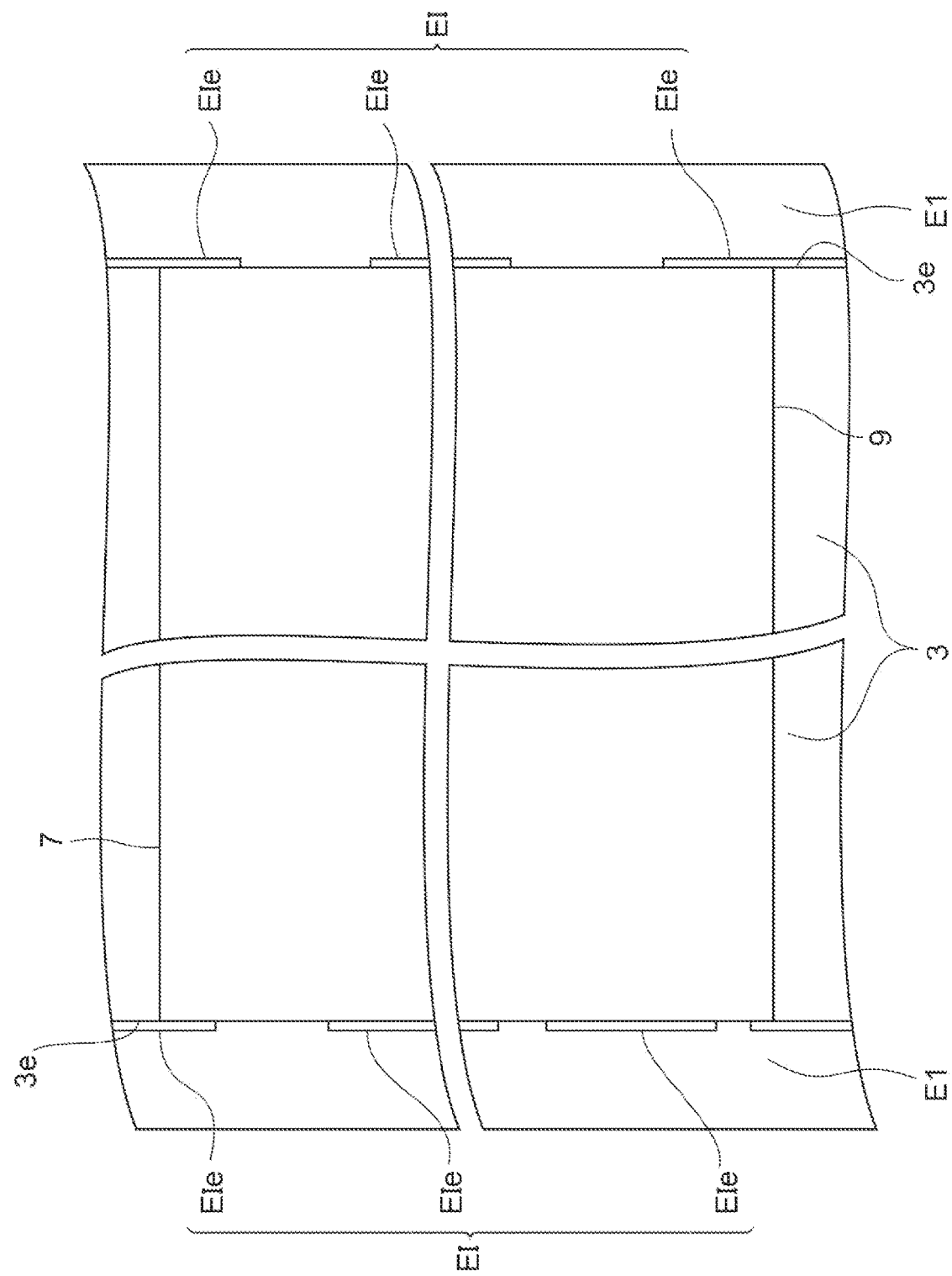
FIG. 5 is a schematic diagram illustrating an external electrode, an electrical insulating film, and an internal electrode.

A configuration of a multilayer capacitor C1 according to an embodiment will be described with reference to FIGS. 1 to 5. FIG. 1 is a perspective view of a multilayer capacitor according to the embodiment. FIGS. 2 and 3 are views illustrating a cross-sectional configuration of the multilayer capacitor according to the embodiment. FIGS. 4 and 5 are schematic diagrams illustrating an external electrode, an electrical insulating film, and an internal electrode. In the present embodiment, an electronic component includes, for example, the multilayer capacitor C1.

As illustrated in FIGS. 1 to 3, the multilayer capacitor C1 includes an element body 3 of a rectangular parallelepiped shape, a plurality of external electrodes 5, and an electrical insulating film EI. In the present embodiment, the multilayer capacitor C1 includes a pair of external electrodes 5. The pair of external electrodes 5 are disposed on an outer surface of the element body 3. The pair of external electrodes 5 are separated from each other. The rectangular parallelepiped shape includes a rectangular parallelepiped shape in which corners and ridges are chamfered, or a rectangular parallelepiped shape in which the corners and ridges are rounded.

The element body 3 includes a pair of side surfaces 3a opposing each other, a pair of side surfaces 3c opposing each other, and a pair of end surfaces 3e opposing each other. The pair of side surfaces 3a, the pair of side surfaces 3c, and the pair of end surfaces 3e each have a substantially rectangular shape. The pair of side surfaces 3a oppose each other in a first direction D1. The pair of side surfaces 3c oppose each other in a third direction D3. The pair of end surfaces 3e oppose each other in a second direction D2. The multilayer capacitor C1 is solder-mounted on an electronic device. The electronic device includes, for example, a circuit board or an electronic component. In the multilayer capacitor C1, one side surfaces 3a opposes the electronic device. The one side surfaces 3a is arranged to constitute a mounting surface. The one side surfaces 3a is the mounting surface. One of the pair of side surfaces 3c may be arranged to constitute the mounting surface. For example, when the side surface 3a constitutes the first side surface, the side surface 3c constitutes the second side surface.

The first direction D1 is a direction orthogonal to each side surfaces 3a, and is orthogonal to the third direction D3. The second direction D2 is a direction parallel to each side surfaces 3a and each side surface 3c, and is orthogonal to the first direction D1 and the third direction D3. The third direction D3 is a direction orthogonal to each side surface 3c, and the second direction D2 is a direction orthogonal to each end surface 3e. In the present embodiment, a length of the element body 3 in the second direction D2 is larger than a length of the element body 3 in the first direction D1 and larger than a length of the element body 3 in the third direction D3. The second direction D2 is a longitudinal direction of the element body 3. The length of the element body 3 in the first direction D1 and the length of the element body 3 in the third direction D3 may be equal to each other. The length of the element body 3 in the first direction D1 and the length of the element body 3 in the third direction D3 may be different.

The length of the element body 3 in the first direction D1 is a height of the element body 3. The length of the element body 3 in the third direction D3 is a width of the element body 3. The length of the element body 3 in the second direction D2 is a length of the element body 3. In the present embodiment, the height of the element body 3 is 0.1 to 2.5 mm, the width of the element body 3 is 0.1 to 5.0 mm, and the length of the element body 3 is 0.2 to 5.7 mm. For example, the height of the element body 3 is 2.5 mm, the width of the element body 3 is 2.5 mm, and the length of the element body 3 is 3.2 mm.

The pair of side surfaces 3c extend in the first direction D1 to couple the pair of side surfaces 3a to each other. The pair of side surfaces 3c also extend in the second direction D2. The pair of end surfaces 3e extend in the first direction D1 to couple the pair of side surfaces 3a to each other. The pair of end surfaces 3e also extend in the third direction D3.

The element body 3 includes four ridge portions 3g, four ridge portions 3i, and four ridge portions 3j. The ridge portion 3g is located between the end surface 3e and the side surfaces 3a. The ridge portion 3i is located between the end surface 3e and the side surface 3c. The ridge portion 3j is located between the side surfaces 3a and the side surface 3c. In the present embodiment, the ridge portions 3g, 3i, and 3j are rounded to be curved. The element body 3 is subjected to what is called a round chamfering process. The end surface 3e and the side surfaces 3a are indirectly adjacent to each other with the ridge portion 3g interposed therebetween. The end surface 3e and the side surface 3c are indirectly adjacent to each other with the ridge portion 3i interposed therebetween. The side surfaces 3a and the side surface 3c are indirectly adjacent to each other with the ridge portion 3j interposed therebetween.

The element body 3 is configured through laminating a plurality of dielectric layers in the first direction D1. The element body 3 includes a plurality of laminated dielectric layers. In the element body 3, a lamination direction of the plurality of dielectric layers coincides with the first direction D1. Each dielectric layer includes, for example, a sintered body of a ceramic green sheet containing a dielectric material. Examples of the dielectric material include dielectric ceramics. Examples of the dielectric ceramics include $BaTiO_3$-based, $Ba(Ti, Zr)O_3$-based, or $(Ba, Ca)TiO_3$-based dielectric ceramics. In the actual element body 3, each of the dielectric layers is integrated to such an extent that a boundary between the dielectric layers cannot be visually recognized.

The electrical insulating film EI is disposed on the element body 3 as illustrated in FIGS. 2 and 3. The electrical insulating film EI is directly disposed on the element body 3. The electrical insulating film EI includes a plurality of film portions EIa, EIc, and EIe. In the present embodiment, the electrical insulating film EI includes a pair of film portions EIa, a pair of film portions EIc, and a pair of film portions EIe. Each film portion EIa is disposed on a corresponding side surface 3a of the pair of side surfaces 3a. Each film portion EIa covers the corresponding side surface 3a and is in direct contact with the corresponding side surface 3a. Each film portion EIc is disposed on a corresponding side surface 3c of the pair of side surfaces 3c. Each film portion EIc covers the corresponding side surface 3c and is in direct contact with the corresponding side surface 3c. Each film portion EIe is disposed on a corresponding end surface 3e of the pair of end surfaces 3e. Each film portion EIe covers the corresponding end surface 3e and is in direct contact with the corresponding end surface 3e. The electrical insulating film EI may constitute an electrical insulator. Each of the film portions EIa, EIc, and EIe may constitute an electrical insulating portion.

The electrical insulating film EI includes a plurality of film portions disposed on ridge portions 3g, 3i, and 3j, respectively. The film portion EIa and the film portion EIc are coupled to each other by the film portion disposed on the ridge portion 3j. The film portion EIa and the film portion EIe are coupled to each other by the film portion disposed on the ridge portion 3g. The film portion EIc and the film portion EIe are coupled to each other by the film portion disposed on the ridge portion 3i. In the present embodiment, the electrical insulating film EI covers substantially the entire element body 3. The plurality of film portions disposed on the respective ridge portions 3g, 3i, and 3j may constitute electrical insulating portions.

The electrical insulating film EI has, for example, an electrical resistivity higher than an electrical resistivity of the element body 3. The electrical resistivity of the element body 3 includes a volume resistivity of the element body 3 or a surface resistivity of the element body 3. The electrical insulating film EI may have an electrical resistivity higher than the volume resistivity of the element body 3 and higher than the surface resistivity of the element body 3.

The electrical insulating film EI includes, for example, an electrical insulating thin film. In this case, the electrical insulating film EI may include a sputtered film. The electrical insulating film EI includes, for example, a silicon oxide film. The silicon oxide film includes, for example, a silicon dioxide film. The electrical insulating film EI may include, for example, an aluminum oxide film.

As illustrated in FIGS. 2 and 3, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of an electrically conductive material that is commonly used as an internal conductor of a multilayer electronic component. The electrically conductive material includes, for example, a base metal. The electrically conductive material includes, for example, Ni or Cu. Each of the internal electrodes 7 and 9 is configured as a sintered body of electrically conductive paste containing the electrically conductive material described above. In the present embodiment, the internal electrodes 7 and 9 are made of Ni.

In FIG. 3, for the sake of explanation, the internal electrodes 7 and 9 are intentionally illustrated so as to be displaced from each other in the third direction D3.

The internal electrodes 7 and the internal electrodes 9 are disposed in different positions (layers) in the first direction D1. The internal electrodes 7 and the internal electrodes 9 are alternately disposed in the element body 3 to oppose each other in the first direction D1 with an interval therebetween. The internal electrodes 7 and the internal electrodes 9 have different polarities from each other. One end of each of the internal electrodes 7 and 9 is exposed to a corresponding end surface 3e of the pair of end surfaces 3e. Each of the internal electrodes 7 and 9 includes the one end exposed to the corresponding end surface 3e.

The plurality of internal electrodes 7 and the plurality of internal electrodes 9 are alternately disposed in the first direction D1. The plurality of internal electrodes 7 and the plurality of internal electrodes 9 are disposed in the element body 3 to be distributed in the first direction D1. Each of the plurality of internal electrodes 7 and the plurality of internal electrodes 9 is located in a plane approximately parallel to the side surfaces 3a. The internal electrode 7 and the internal electrode 9 oppose each other in the first direction D1. The direction (first direction D1) in which the internal electrode 7 and the internal electrode 9 oppose each other is orthogonal to a direction parallel to the side surfaces 3a (second direction D2 and third direction D3).

The plurality of internal electrodes 7 include one internal electrode 7A located on the outermost side in the first direction D1. The one internal electrode 7A opposes one side surface 3a of the pair of side surface 3a in the first direction D1. The plurality of internal electrodes 9 include one internal electrode 9A located on the outermost side in the first direction D1. The one internal electrode 7A opposes another side surface 3a of the pair of side surface 3a in the first direction D1. Each internal electrode 7A and 9A constitutes the outermost internal electrode.

As illustrated in FIGS. 1 to 3, the external electrodes 5 are disposed on the element body 3. In the present embodiment, the external electrodes 5 are disposed on the electrical insulating film EI. The external electrodes 5 are disposed directly on the electrical insulating film EI and indirectly on the element body 3.

The external electrodes 5 are disposed at both ends of the element body 3 in the second direction D2. Each external electrode 5 is disposed on the corresponding end surface 3e side of the element body 3. In the present embodiment, each external electrode 5 is element on the pair of side surfaces 3a, the pair of side surfaces 3c, and the end surface 3e. The external electrode 5 includes a plurality of electrode portions 5a, 5c, and 5e as illustrated in FIGS. 2 and 3. The electrode portion 5a is disposed on the side surfaces 3a and on the ridge portion 3g. Each electrode portion 5c is disposed on the side surface 3c and on the ridge portion 3i. The electrode portion 5e is disposed on the end surface 3e. The external electrode 5 also includes an electrode portion disposed on the ridge portion 3j.

The external electrodes 5 are formed on the electrical insulating film EI to cover the five surfaces of the pair of side surfaces 3a, the end surface 3e, and the pair of side surfaces 3c and the ridge portions 3g, 3i, and 3j. The electrode portions 5a, 5c, and 5e adjacent to each other are coupled and are electrically connected to each other. The electrode portion 5e covers all the one ends of corresponding internal electrodes 7 and 9 of the plurality of internal electrodes 7 and 9. The electrode portion 5e is directly connected to the corresponding internal electrodes 7 and 9. The external electrode 5 is electrically connected to the corresponding internal electrodes 7 and 9. As illustrated in FIGS. 2 and 3, the external electrode 5 includes a first electrode layer E1, a second electrode layer E2, and a third electrode layer E3. The third electrode layer E3 is arranged to constitute the outermost layer of the external electrode 5. Each of the electrode portions 5a, 5c, and 5e includes the first electrode layer E1, the second electrode layer E2, and the third electrode layer E3. Each of the electrode portions 5a, 5c, and 5e is three-layered.

The first electrode layer E1 of the electrode portion 5a is disposed on the side surface 3a and on the ridge portion 3g. The first electrode layer E1 of the electrode portion 5a is formed on the electrical insulating film EI to cover a part of the side surface 3a and the entire ridge portion 3g. The first electrode layer E1 of the electrode portion 5a is in contact with the electrical insulating film EI on the above-described part of the side surface 3a and on the ridge portion 3g. In the electrode portion 5a, the first electrode layer E1 is in direct contact with the electrical insulating film EI (film portion EIa). The side surface 3a is indirectly covered with the first electrode layer E1 in the above-described part, and is exposed from the first electrode layer E1 in the remaining portion excluding the above-described part. The above-described part of the side surface 3a is a partial region of the side surface 3a near the end surface 3e. The first electrode layer E1 of the electrode portion 5a is located on the side surface 3a. The first electrode layer E1 may not be formed on the side surface 3a. The first electrode layer E1 may not be disposed on the side surface 3a.

The second electrode layer E2 of the electrode portion 5a is disposed on the first electrode layer E1 and on the side surface 3a. In the electrode portion 5a, the second electrode layer E2 is formed on the first electrode layer E1 and the electrical insulating film EI to cover the first electrode layer E1 and a part of the side surface 3a. In the electrode portion 5a, the second electrode layer E2 is in direct contact with the first electrode layer E1 and the electrical insulating film EI. The second electrode layer E2 of the electrode portion 5a directly covers a part of the film portion EIa and is in direct contact with the film portion EIa. The second electrode layer E2 of the electrode portion 5a is formed on the first electrode layer E1 to directly cover the entire first electrode layer E1 of the electrode portion 5a. In the electrode portion 5a, the second electrode layer E2 indirectly covers the side surface 3a so that the first electrode layer E1 is located between the second electrode layer E2 and the side surface 3a. The second electrode layer E2 of the electrode portion 5a is located on the side surface 3a. Therefore, the second electrode layer E2 includes a portion located on the side surface 3a.

The third electrode layer E3 of the electrode portion 5a is disposed on the second electrode layer E2. In the electrode portion 5a, the third electrode layer E3 covers the entire second electrode layer E2. In the electrode portion 5a, the third electrode layer E3 is in contact with the entire second electrode layer E2. In the electrode portion 5a, the third electrode layer E3 is in direct contact with the second electrode layer E2. In the electrode portion 5a, the third electrode layer E3 is not in direct contact with the first electrode layer E1. The third electrode layer E3 of the electrode portion 5a is located on the side surface 3a.

The first electrode layer E1 of the electrode portion 5c is disposed on the side surface 3c and on the ridge portion 3i. The first electrode layer E1 of the electrode portion 5c is formed on the electrical insulating film EI to cover a part of the side surface 3c and the entire ridge portion 3i. The first electrode layer E1 of the electrode portion 5c is in contact with the electrical insulating film EI on the above-described part of the side surface 3c and on the ridge portion 3g. In the electrode portion 5c, the first electrode layer E1 is in direct contact with the electrical insulating film EI (film portion EIc). The side surface 3c is indirectly covered with the first electrode layer E1 in the above-described part, and is exposed from the first electrode layer EI in the remaining portion excluding the above-described part. The above-described part of the side surface 3c is a partial region of the side surface 3c near the end surface 3e. The first electrode layer E1 of the electrode portion 5c is located on the side surface 3c. The first electrode layer E1 may not be formed on the side surface 3c. The first electrode layer E1 may not be disposed on the side surface 3c.

The second electrode layer E2 of the electrode portion 5c is disposed on the first electrode layer E1 and on the side surface 3c. In the electrode portion 5c, the second electrode layer E2 is formed on the first electrode layer E1 and the electrical insulating film EI to cover the first electrode layer E1 and a part of the side surface 3c. In the electrode portion 5c, the second electrode layer E2 is in direct contact with the first electrode layer E1 and the electrical insulating film EI. The second electrode layer E2 of the electrode portion 5c directly covers a part of the film portion EIc and is in direct contact with the film portion EIc. The second electrode layer E2 of the electrode portion 5c is formed on the first electrode layer E1 to directly cover the entire first electrode layer E1 of the electrode portion 5c. In the electrode portion 5c, the second electrode layer E2 indirectly covers the side surface 3c so that the first electrode layer E1 is located between the second electrode layer E2 and the side surface 3c. The second electrode layer E2 of the electrode portion 5c is located on the side surface 3c. Therefore, the second electrode layer E2 includes a portion located on the side surface 3c.

The third electrode layer E3 of the electrode portion 5c is disposed on the second electrode layer E2. In the electrode portion 5c, the third electrode layer E3 covers the entire second electrode layer E2. In the electrode portion 5c, the third electrode layer E3 is in contact with the entire second electrode layer E2. In the electrode portion 5c, the third electrode layer E3 is in direct contact with the second electrode layer E2. In the electrode portion 5c, the third electrode layer E3 is not in direct contact with the first electrode layer E1. The third electrode layer E3 of the electrode portion 5c is located on the side surface 3c.

The first electrode layer E1 of the electrode portion 5e is disposed on the end surface 3e. The first electrode layer E1 of the electrode portion 5e is formed on the electrical insulating film EI to cover the entire end surface 3e. The first electrode layer E1 of the electrode portion 5e is in contact with the electrical insulating film EI on the end surface 3e.

In the electrode portion 5e, the first electrode layer E1 is in direct contact with the electrical insulating film EI (film portion EIe). The end surface 3e is indirectly covered with the first electrode layer E1.

The second electrode layer E2 of the electrode portion 5e is disposed on the first electrode layer E1. In the electrode portion 5e, the second electrode layer E2 is formed on the first electrode layer E1 to cover the entire first electrode layer E1. In the electrode portion 5e, the second electrode layer E2 is in direct contact with the first electrode layer E1. In the electrode portion 5e, the second electrode layer E2 indirectly covers the end surface 3e so that the first electrode layer E1 is located between the second electrode layer E2 and the end surface 3e. The second electrode layer E2 of the electrode portion 5e is located on the end surface 3e. Therefore, the second electrode layer E2 includes a portion located on the end surface 3e.

The third electrode layer E3 of the electrode portion 5e is disposed on the second electrode layer E2. In the electrode portion 5e, the third electrode layer E3 covers the entire second electrode layer E2. In the electrode portion 5e, the third electrode layer E3 is in contact with the entire second electrode layer E2. In the electrode portion 5e, the third electrode layer E3 is in direct contact with the second electrode layer E2. In the electrode portion 5e, the third electrode layer E3 is not in direct contact with the first electrode layer E1.

The electrical insulating film EI includes a portion covered with the external electrode 5 and a portion exposed from the external electrode 5. The film portion EIa includes a portion covered with the electrode portion 5a and a portion exposed from the electrode portion 5a. The film portion EIc includes a portion covered with the electrode portion 5c and a portion exposed from the electrode portion 5c.

The portion included in the electrical insulating film EI and exposed from the external electrode 5 is located on a region between a plurality of external electrodes 5 on the surface of the element body 3. Therefore, the electrical insulating film EI includes a film portion located at least on a region between the plurality of external electrodes 5 on the surface of the element body 3. The electrical insulating film EI includes a film portion located at least on a region exposed from the plurality of external electrodes 5 on the surface of the element body 3.

The first electrode layer E1 is formed from sintering electrically conductive paste applied onto the surface of the element body 3. The first electrode layer E1 is formed on the electrical insulating film EI to cover the above-described part of the side surfaces 3a, the above-described part of the side surface 3c, the end surface 3e, and the ridge portions 3g, 3i, and 3j. The first electrode layer E1 is formed from sintering a metal component contained in the electrically conductive paste. The metal component contained in the electrically conductive paste includes, for example, a metal particle. The first electrode layer E1 includes a sintered metal layer. The first electrode layer E1 includes a sintered metal layer formed on the element body 3. The first electrode layer E1 is formed indirectly on the element body 3. In the present embodiment, the first electrode layer E1 includes a sintered metal layer made of Cu. The first electrode layer E1 may include a sintered metal layer made of Ni. The first electrode layer E1 contains a base metal. The electrically conductive paste contains, for example, particles formed of Cu or Ni, a glass component, an organic binder, and an organic solvent. The first electrode layer E1 included in each of the electrode portions 5a, 5c, and 5e is integrally formed.

As illustrated in FIGS. 4 and 5, the first electrode layer E1 is also physically connected to the corresponding internal electrodes 7 and 9. In FIGS. 4 and 5, the hatching illustrating the cross section is omitted.

The electrical insulating film EI (film portion EIe) is not always uniformly formed with a predetermined film thickness. The material component constituting the electrical insulating film EI, for example, silicon oxide, is not densely attached to the outer surface of the element body 3 but sparsely attached thereto. Therefore, the first electrode layer E1 can be partially directly connected to the corresponding internal electrodes 7 and 9.

When the conductive paste is heated, the material component constituting the electrical insulating film EI diffuses into the conductive paste, so that the material component constituting the electrical insulating film EI and the conductive paste are mixed. Therefore, even when the material component constituting the electrical insulating film EI is densely attached to the outer surface of the element body 3, the first electrode layer E1 can be partially directly connected to the corresponding internal electrodes 7 and 9.

The second electrode layer E2 is formed from curing electrically conductive resin applied onto the first electrode layer E1 and the electrical insulating film EI. The second electrode layer E2 is formed on the first electrode layer E1 and the electrical insulating film EI. The first electrode layer E1 is an underlying metal layer for forming the second electrode layer E2. The second electrode layer E2 is an electrically conductive resin layer that covers the first electrode layer E1. The conductive resin contains, for example, a resin, an electrically conductive material, and an organic solvent. The resin includes, for example, a thermosetting resin. The conductive material includes, for example, metal particles. Metal particles include, for example, silver particles or copper particles. In the present embodiment, the second electrode layer E2 includes a plurality of silver particles. The second electrode layer E2 includes a plurality of metal particles. The thermosetting resin is, for example, a phenol resin, an acrylic resin, a silicone resin, an epoxy resin, or a polyimide resin. The second electrode layer E2 included in each of the electrode portions 5a, 5c, and 5e is integrally formed.

The third electrode layer E3 is formed on the second electrode layer E2 and on the first electrode layer E1 (a portion exposed from the second electrode layer E2) through a plating method. The third electrode layer E3 may have a multilayer structure. In this case, the third electrode layer E3 includes, for example, an Ni plating layer and a solder plating layer. The Ni plating layer is formed on the second electrode layer E2 and on the first electrode layer E1. The solder plating layer is formed on the Ni plating layer. The solder plating layer covers the Ni plating layer. The Ni plating layer has better solder leach resistance than the metal contained in the second electrode layer E2. The third electrode layer E3 may include an Sn plating layer, a Cu plating layer, or an Au plating layer instead of the Ni plating layer. The solder plating layer includes, for example, an Sn plating layer, an Sn—Ag alloy plating layer, an Sn—Bi alloy plating layer, or an Sn—Cu alloy plating layer. The third electrode layer E3 included in each of the electrode portions 5a, 5c, and 5e is integrally formed. As illustrated in FIG. 2, the internal electrode 7A opposes the second electrode layer E2 included in the electrode portion 5a that is not electrically connected to the internal electrode 7A, in the first direction D1. When the internal electrode 7A and the second electrode layer E2 included in the electrode portion 5a that is not electrically connected to the internal electrode 7A are viewed from the first direction D1, the internal electrode 7A and the second electrode layer E2 included in the electrode portion 5a that is not electrically connected to the internal electrode 7A overlap each other. Therefore, an electric field tends to be generated between the internal electrode 7A and the second electrode layer E2 included in the electrode portion 5a that is not electrically connected to the internal electrode 7A.

The film portion EIa is located between the internal electrode 7A and the second electrode layer E2 included in the electrode portion 5a that is not electrically connected to the internal electrode 7A. The internal electrode 7A and the second electrode layer E2 included in the electrode portion 5a that is not electrically connected to the internal electrode 7A oppose each other in a state in which the film portion EIa is present between the internal electrode 7A and the second electrode layer E2 included in the electrode portion 5a that is not electrically connected to the internal electrode 7A. The internal electrode 7A and the second electrode layer E2 included in the electrode portion 5a that is not electrically connected to the internal electrode 7A indirectly oppose each other.

As illustrated in FIG. 2, the internal electrode 9A opposes the second electrode layer E2 included in the electrode portion 5a that is not electrically connected to the internal electrode 9A, in the first direction D1. When the internal electrode 9A and the second electrode layer E2 included in the electrode portion 5a that is not electrically connected to the internal electrode 9A are viewed from the first direction D1, the internal electrode 9A and the second electrode layer E2 included in the electrode portion 5a that is not electrically connected to the internal electrode 9A overlap each other. Therefore, an electric field tends to be generated between the internal electrode 9A and the second electrode layer E2 included in the electrode portion 5a that is not electrically connected to the internal electrode 9A.

The film portion EIa is located between the internal electrode 9A and the second electrode layer E2 included in the electrode portion 5a that is not electrically connected to the internal electrode 9A. The internal electrode 9A and the second electrode layer E2 included in the electrode portion 5a that is not electrically connected to the internal electrode 9A oppose each other in a state in which the film portion EIa is present between the internal electrode 9A and the second electrode layer E2 included in the electrode portion 5a that is not electrically connected to the internal electrode 9A. The internal electrode 9A and the second electrode layer E2 included in the electrode portion 5a that is not electrically connected to the internal electrode 9A indirectly oppose each other.

As illustrated in FIG. 3, each of the plurality of internal electrodes 7 opposes the second electrode layer E2 included in the electrode portion 5c that is not electrically connected to the internal electrode 7, in the third direction D3. When each internal electrode 7 and the second electrode layer E2 included in the electrode portion 5c that is not electrically connected to the internal electrode 7 are viewed from the third direction D3, each internal electrode 7 and the second electrode layer E2 included in the electrode portion 5c that is not electrically connected to the internal electrode 7 overlap each other. Therefore, an electric field tends to be generated between each internal electrode 7 and the second electrode layer E2 included in the electrode portion 5c that is not electrically connected to the internal electrode 7.

The film portion EIc is located between each internal electrode 7 and the second electrode layer E2 included in the electrode portion 5c that is not electrically connected to the internal electrode 7. Each internal electrode 7 and the second electrode layer E2 included in the electrode portion 5c that is not electrically connected to the internal electrode 7 oppose each other in a state in which the film portion EIc is present between each internal electrode 7 and the second electrode layer E2 included in the electrode portion 5c that is not electrically connected to the internal electrode 7. Each internal electrode 7 and the second electrode layer E2 included in the electrode portion 5c that is not electrically connected to the internal electrode 7 indirectly oppose each other.

As illustrated in FIG. 3, each of the plurality of internal electrodes 9 opposes the second electrode layer E2 included in the electrode portion 5c that is not electrically connected to the internal electrode 9, in the third direction D3. When each internal electrode 9 and the second electrode layer E2 included in the electrode portion 5c that is not electrically connected to the internal electrode 9 are viewed from the third direction D3, each internal electrode 9 and the second electrode layer E2 included in the electrode portion 5c that is not electrically connected to the internal electrode 9 overlap each other. Therefore, an electric field tends to be generated between each internal electrode 9 and the second electrode layer E2 included in the electrode portion 5c that is not electrically connected to the internal electrode 9.

The film portion EIc is located between each internal electrode 9 and the second electrode layer E2 included in the electrode portion 5c that is not electrically connected to the internal electrode 9. Each internal electrode 9 and the second electrode layer E2 included in the electrode portion 5c that is not electrically connected to the internal electrode 9 oppose each other in a state in which the film portion EIc is present between each internal electrode 9 and the second electrode layer E2 included in the electrode portion 5c that is not electrically connected to the internal electrode 9. Each internal electrode 9 and the second electrode layer E2 included in the electrode portion 5c that is not electrically connected to the internal electrode 9 indirectly oppose each other.

Figure 6:
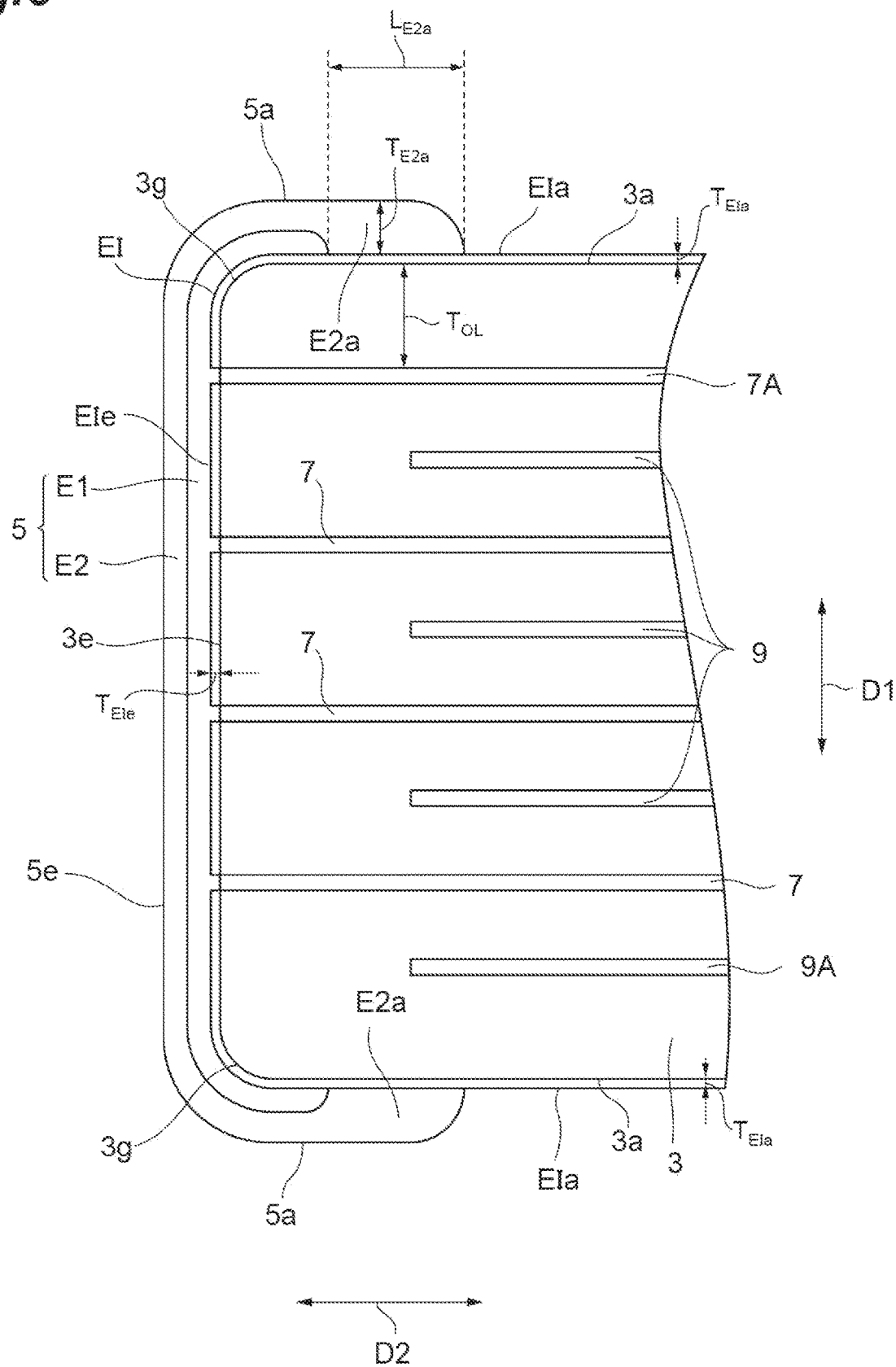
FIG. 6 is a schematic diagram illustrating a cross-sectional configuration of the multilayer capacitor.
Figure 7:
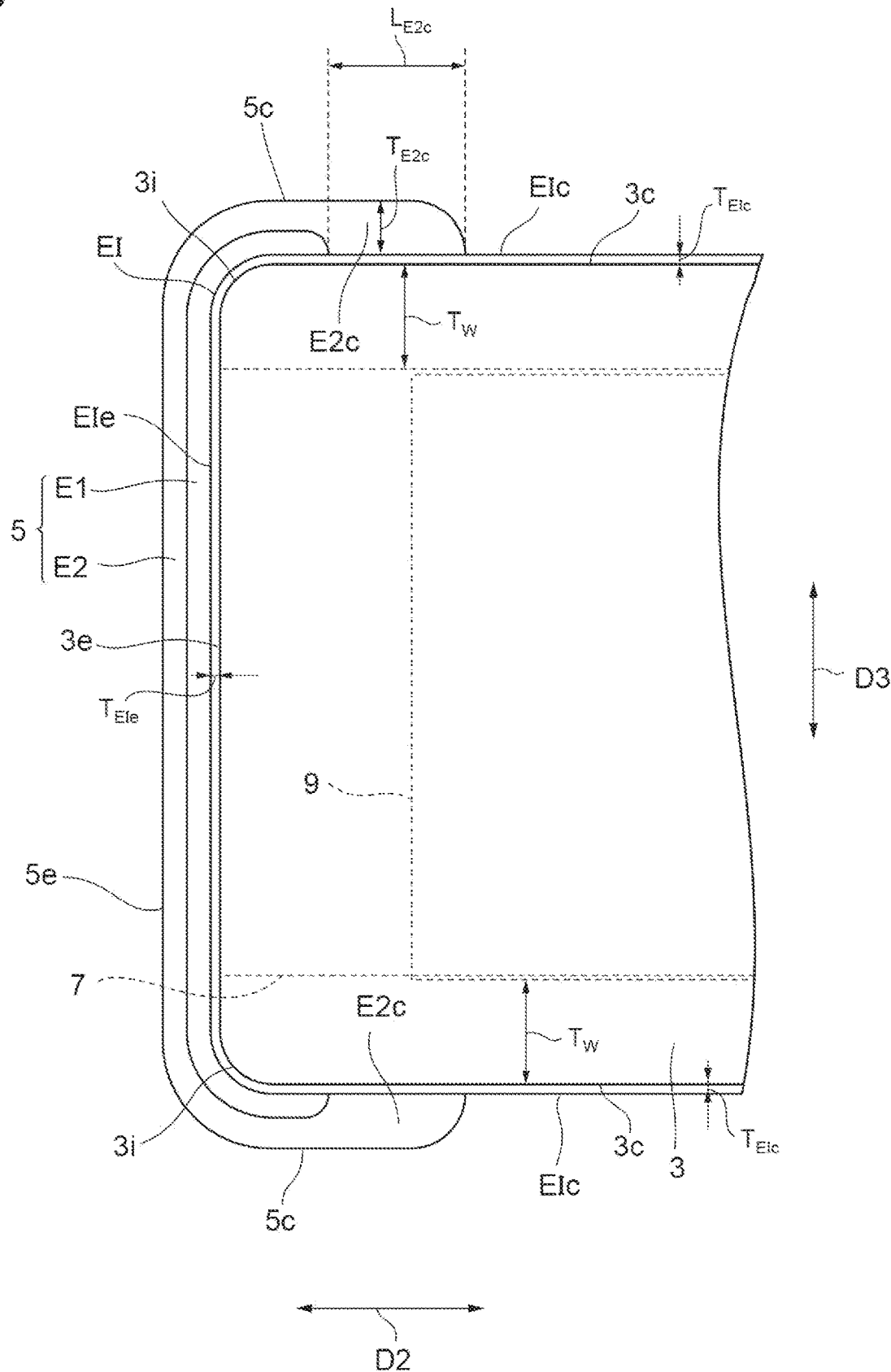
FIG. 7 is a schematic diagram illustrating a cross-sectional configuration of the multilayer capacitor.

The configuration of the multilayer capacitor C1 will be described with reference to FIGS. 6 and 7. As described above, the multilayer capacitor C1 includes the element body 3, the electrical insulating film EI, and the external electrode 5. FIGS. 6 and 7 are schematic diagrams illustrating a cross-sectional configuration of a multilayer capacitor. In FIGS. 6 and 7, the third electrode layer E3 is not illustrated. In FIGS. 6 and 7, the hatching illustrating the cross section is omitted. In FIG. 7, as in FIG. 3, the internal electrodes 7 and 9 are intentionally illustrated so as to be displaced from each other in the third direction D3.

An average thickness $T_{EIa}$ of the film portion EIa is equal to or greater than an average thickness $T_{EIe}$ of the film portion EIe. The average thickness $T_{EIa}$ is, for example, 0.02 μm or more. The average thickness $T_{EIa}$ may be 0.05 μm or more. The average thickness $T_{EIe}$ is, for example, greater than 0 and 0.2 μm or less.

A distance $T_{OL}$ between the internal electrode 7A and the side surface 3a opposing the internal electrode 7A is, for example, 100 μm or more and 400 μm or less. The distance $T_{OL}$ is a distance between the internal electrode 7A and the side surface 3a in the first direction D1.

A ratio ($T_{EIa}/T_{OL}$) of the average thickness $T_{EIa}$ to the distance $T_{OL}$ is, for example, $1.0\times10^{-4}$ or more. The ratio ($T_{EIa}/T_{OL}$) may be $2.5\times10^{-4}$ or more.

Although not illustrated, the distance between the internal electrode 9A and the side surface 3a opposing the internal electrode 9A is, for example, 100 μm or more and 400 μm or less. The distance between the internal electrode 9A and the side surface 3a opposing the internal electrode 9A may be the same as or different from the distance $T_{OL}$.

A ratio of the average thickness $T_{EIa}$ to the distance between the internal electrode 9A and the side surface 3a facing the internal electrode 9A is, for example, $1.0 \times 10^{-4}$ or more. The ratio of the average thickness $T_{EIa}$ to the distance between the internal electrode 9A and the side surface 3a opposing the internal electrode 9A may be $2.5 \times 10^{4}$ or more.

An average thickness $T_{EIc}$ of the film portion EIc is equal to or greater than the average thickness $T_{EIe}$. The average thickness $T_{EIc}$ is, for example, 0.02 µm or more. The average thickness $T_{EIc}$ may be 0.05 µm or more. The average thickness $T_{EIc}$ may be equal to or different from the average thickness $T_{EIa}$.

A distance $T_W$ between the internal electrodes 7 and 9 and the side surface 3c is, for example, 50 µm or more and 300 µm or less.

A ratio ($T_{EIc}/T_W$) of the average thickness $T_{EIc}$ to the distance $T_W$ is, for example, $1.0 \times 10^{-4}$ or more. The ratio ($T_{EI}/T_{OL}$) may be $2.5 \times 10^{-4}$ or more.

The second electrode layer E2 (second electrode layer E2 included in the electrode portion 5a) includes a portion E2a in contact with the electrical insulating film EI. A maximum thickness $T_{E2a}$ of the portion E2a is, for example, 20 µm or more and 60 µm or less.

A ratio ($T_{EIa}/T_{E2a}$) of the average thickness $T_{EIa}$ to the maximum thickness $T_{E2}$ is, for example, $6.67 \times 10$ or more. The ratio ($T_{EIa}/T_{E2a}$) may be $1.67 \times 10^{-3}$ or more.

The second electrode layer E2 (second electrode layer E2 included in the electrode portion 5c) includes a portion E2c in contact with the electrical insulating film EI. A maximum thickness $T_{E2c}$ of the portion E2c is, for example, 20 µm or more and 60 µm or less. The maximum thickness $T_{E2c}$ may be the same as or different from the maximum thickness $T_{E2a}$.

A ratio ($T_{EIc}/T_{E2c}$) of the average thickness $T_{EIc}$ to the maximum thickness $T_{E2c}$ is, for example, $6.67 \times 10^{-4}$ or more. The ratio ($T_{EIc}/T_{E2c}$) may be $1.67 \times 10^{3}$ or more.

A length $L_{E2a}$ of the portion E2a in the second direction D2 is, for example, 30 µm or more and 500 µm or less. The length $L_{E2a}$ is a distance between an end edge of the second electrode layer E2 included in the electrode portion 5a and an end edge of the first electrode layer E1 included in the electrode portion 5a in the second direction D2.

A ratio ($T_{EIa}/L_{E2a}$) of the average thickness $T_{EIa}$ to the length $L_{E2a}$ is, for example, $8.0 \times 10^{-5}$ or more. The ratio ($T_{EIa}/L_{E2a}$) may be $2.0 \times 10^{-4}$ or more.

A length $L_{E2c}$ of the portion E2c in the second direction D2 is, for example, 30 µm or more and 500 µm or less. The length $L_{E2c}$ is a distance between an end edge of the second electrode layer E2 included in the electrode portion 5c and an end edge of the first electrode layer E1 included in the electrode portion 5c in the second direction D2.

A ratio ($T_{EIa}/L_{E2c}$) of the average thickness $T_{EIc}$ to the length $L_{E2c}$ is, for example, $8.0 \times 10^{-5}$ or more. The ratio ($T_{EIa}/L_{E2c}$) may be $2.0 \times 10^{-4}$ or more.

The average thicknesses $T_{EIa}$, $T_{EIc}$, and $T_{EIe}$ can be obtained, for example, as follows.

A cross-sectional photograph of the electrical insulating film EI including each of the film portions EIa and EIe is acquired. The cross-sectional photograph is a photograph of a cross section when the multilayer capacitor C1 is cut along a plane perpendicular to the side surface 3a. The cross-sectional photograph is, for example, a photograph of a cross section of the multilayer capacitor C1 when cut in a plane parallel to the pair of side surfaces 3c and equidistant from the pair of side surfaces 3c. The acquired cross-sectional photograph is image-processed by software. By this image processing, a boundary of the electrical insulating film EI (film portions EIa and EIe) is determined. An area of each of the film portions EIa and EIe on the acquired cross-sectional photograph is calculated.

The area of the film portion EIa is divided by a length of the film portion EIa on the acquired cross-sectional photograph, and the obtained quotient is set as the average thickness $T_{EIa}$. The area of the film portion EIe is divided by a length of the film portion EIe on the acquired cross-sectional photograph, and the obtained quotient is set as the average thickness $T_{EIe}$.

A cross-sectional photograph of the electrical insulating film EI including the film portion EIc is acquired. The cross-sectional photograph is a photograph of a cross section when the multilayer capacitor C1 is cut along a plane perpendicular to the side surface 3c. The cross-sectional photograph is, for example, a photograph of a cross section of the multilayer capacitor C1 when cut in a plane parallel to the pair of side surfaces 3a and equidistant from the pair of side surfaces 3a. The acquired cross-sectional photograph is image-processed by software. By this image processing, a boundary of the electrical insulating film EI (film portion EIc) is determined. An area of the film portion EIc on the acquired cross-sectional photograph is calculated.

The area of the film portion EIc is divided by a length of the film portion EIc on the acquired cross-sectional photograph, and the obtained quotient is set as the average thickness $T_{EIc}$.

The distance $T_{OL}$, the maximum thickness $T_{E2a}$, and the length $L_{E2a}$ can be obtained, for example, as follows.

A cross-sectional photograph of the element body 3 and the external electrode 5 including the electrode portion 5a is acquired. The cross-sectional photograph is a photograph of a cross section when the multilayer capacitor C1 is cut along a plane perpendicular to the side surface 3a. The cross-sectional photograph is, for example, a photograph of a cross section of the multilayer capacitor C1 when cut in a plane parallel to the pair of side surfaces 3c and equidistant from the pair of side surfaces 3c. The acquired cross-sectional photograph is image-processed by software. By this image processing, a boundary of the second electrode layer E2 is determined. The maximum thickness $T_{E2a}$ and the length $L_{E2a}$ on the acquired cross-sectional photograph are calculated. By the above image processing, a boundary between the side surface 3a and the electrical insulating film EI and a boundary between the element body 3 and the internal electrode 7A are determined. The distance $T_{OL}$ on the acquired cross-sectional photograph is calculated.

The distance $T_W$, the maximum thickness $T_{E2c}$, and the length $L_{E2c}$ can be calculated, for example, as follows.

A cross-sectional photograph of the element body 3 and the external electrode 5 including the electrode portion 5c is acquired. The cross-sectional photograph is a photograph of a cross section when the multilayer capacitor C1 is cut along a plane perpendicular to the side surface 3c. The cross-sectional photograph is, for example, a photograph of a cross section of the multilayer capacitor C1 when cut in a plane parallel to the pair of side surfaces 3a and equidistant from the pair of side surfaces 3a. The acquired cross-sectional photograph is image-processed by software. By this image processing, a boundary of the second electrode layer E2 is determined. The maximum thickness $T_{E2c}$ and the length $L_{E2c}$ on the acquired cross-sectional photograph are calculated. By the above image processing, a boundary between the side surface 3c and the electrical insulating film EI and a boundary between the element body 3 and the internal electrodes 7 and 9 are determined. The distance $T_W$ on the acquired cross-sectional photograph is calculated.

Next, the relationship between the average thickness $T_{EIa}$, the distance $T_{OL}$, the maximum thickness $T_{E2a}$, and the length $L_{E2a}$ will be described in detail.

The present inventors performed the following tests in order to clarify the relationship between the average thickness $T_{EIa}$, the distance $T_{OL}$, the maximum thickness $T_{E2a}$, and the length $L_{E2a}$. In this test, the present inventors prepared samples S1 to S10 having different average thickness $T_{EIa}$, and checked occurrence of migration in each of the samples S1 to S10. The results are illustrated in FIG. 8. FIG. 8 is a table illustrating occurrence of migration in each sample Each of the samples S1 to S10 is a multilayer capacitor having the same configuration except that the average thickness $T_{EIa}$ is different. In each of the samples S1 to S10, the height of the element body 3 is 1.6 mm, the width of the element body 3 is 1.6 mm, and the length of the element body 3 is 3.2 mm. The capacitance of each of the samples S1 to S10 is 2.2 μF. In each of the samples S1 to S10, the distance $T_{OL}$ is 200 μm, the maximum thickness $T_{E2a}$ is 30 μm, and the length $L_{E2a}$ is 250 μm.

In the sample S1, the average thickness $T_{EIa}$ is 0 μm. The sample S1 does not have the electrical insulating film EI.

In the sample S2, the average thickness $T_{EIa}$ is 0.0015 μm. In the sample S3, the average thickness $T_{EIa}$ is 0.005 μm. In the sample S4, the average thickness $T_{EIa}$ is 0.01 μm. In the sample S5, the average thickness $T_{EIa}$ is 0.02 μm. In the sample S6, the average thickness $T_{EIa}$ is 0.05 μm. In the sample S7, the average thickness $T_{EIa}$ is 0.1 μm. In the sample S8, the average thickness $T_{EIa}$ is 0.15 μm. In the sample S9, the average thickness $T_{EIa}$ is 0.2 μm. In the sample S10, the average thickness $T_{EIa}$ is 0.5 μm.

The occurrence of the migration is checked as follows.

A high temperature bias test is performed on each of the samples S1 to S10. In the high temperature bias test, a predetermined voltage is applied to each of the samples S1 to S10 for a predetermined time in a high temperature environment. In this test, the environmental temperature is 150° C., the applied voltage is 50 V, and the voltage application time is 2000 hours.

After the high temperature bias test, it is checked whether or not the migration has occurred. If the migration has occurred, a maximum length of the migration is measured.

As a result of the test described above, as illustrated in FIG. 8, no migration was observed in each of the samples S6 to S10. In contrast, in each of the samples S1 to S5, the occurrence of the migration was observed.

In the samples S1 to S4, the maximum migration length was 200 μm or more. In contrast, in the sample S5, the maximum migration length was 62 μm. It was confirmed that the sample S5 tended to control the occurrence of the migration as compared with the samples S1 to S4.

Under the circumstances in which a multilayer capacitor is actually used, the maximum migration length is required to be 70 μm or less, and further required to be 50 μm or less.

In the multilayer capacitor C1, the film portion EIa included in the electrical insulating film EI is located at least on a region between the plurality of external electrodes 5 on the surface of the element body 3. Therefore, even when the metal particle included in the second electrode layer E2 is ionized, the film portion EIa prevents the generated metal ion from reacting with the electron supplied from the element body 3 or the external electrode 5. The electron tends not to be supplied to the metal ion. Consequently, in the multilayer capacitor C1, the occurrence of migration is suppressed.

In the multilayer capacitor C1, the film portion EIc included in the electrical insulating film EI is also located at least on the region between the plurality of external electrodes 5 on the surface of the element body 3. Therefore, even in the multilayer capacitor C1, the occurrence of migration is further suppressed.

In a configuration in which the electrode portion 5a includes the second electrode layer E2, the metal particle included in the second electrode layer E2 of the electrode portion 5a may be ionized.

In the multilayer capacitor C1, the film portion Ea is located on the side surface 3a. Therefore, the film portion EIa reliably inhibits the reaction between the metal ion generated from the metal particle included in the second electrode layer E2 of the electrode portion 5a and the electron supplied from the element body 3 or the external electrode 5. Consequently, the multilayer capacitor C1 reliably controls the occurrence of the migration.

In a configuration in which the electrode portion 5c includes the second electrode layer E2, the metal particle included in the second electrode layer E2 of the electrode portion 5c may be ionized.

In the multilayer capacitor C1, the film portion EIc is located on the side surface 3c. Therefore, the film portion EIc reliably prevents the metal ion generated from the metal particle included in the second electrode layer E2 of the electrode portion 5c from reacting with the electron supplied from the element body 3 or the external electrode 5.

Consequently, the multilayer capacitor C1 reliably controls the occurrence of the migration.

In a configuration in which the external electrode 5 includes the third electrode layer E3, a plating solution may infiltrate into the element body 3 from the end surface 3e. Infiltration of the plating solution into the element body 3 may deteriorate electrical characteristics of the multilayer capacitor C1.

In the multilayer capacitor C1, the electrical insulating film EI includes the film portion EIe. Therefore, even in a configuration in which the external electrode 5 includes the third electrode layer E3, the film portion EIe prevents the plating solution from infiltrating into the element body 3. Consequently, the multilayer capacitor C1 controls the deterioration of the electrical characteristics of the multilayer capacitor C1.

In the multilayer capacitor C1, the first electrode layer E1 is disposed on the electrical insulating film EI. Therefore, even when the metal particle included in the second electrode layer E2 is ionized, the electron tends not to be supplied to the metal ion. Consequently, the multilayer capacitor C1 further controls the occurrence of the migration.

In the multilayer capacitor C1, the average thickness $T_{EIa}$ is equal to or greater than the average thickness $T_{EIe}$. Therefore, the multilayer capacitor C1 more reliably prevents the metal ion generated from the metal particle included in the second electrode layer E2 of the electrode portion 5a from reacting with the electron supplied from the element body 3 or the external electrode 5. Consequently, the multilayer capacitor C1 more reliably controls the occurrence of the migration.

In a configuration in which the electrical insulating film EI includes the film portion EIe, this configuration may reduce connectivity between the first electrode layer E1 and the internal electrodes 7 and 9 corresponding to each other.

In the multilayer capacitor C1, the average thickness $T_{EIe}$ is less than the average thickness $T_{EIa}$. Therefore, the multilayer capacitor C1 prevents a decrease in connectivity between the first electrode layer E1 and the internal electrodes 7 and 9 corresponding to each other.

In the multilayer capacitor C1, the average thickness $T_{EIa}$ is 0.05 μm or more. Therefore, the multilayer capacitor C1 reliably controls the occurrence of the migration.

In the multilayer capacitor C1, the average thickness $T_{EIe}$ is greater than 0 and 0.2 μm or less. Therefore, the multilayer capacitor C1 reliably controls the deterioration of the electrical characteristics of the multilayer capacitor C1 and the decrease in the connectivity between the first electrode layer E1 and the internal electrodes 7 and 9 corresponding to each other.

In a configuration in which the distance $T_{OL}$ is less than 100 μm, an electron tends to be supplied from the internal electrodes 7A and 9A to the metal ion. In the multilayer capacitor C1, the distance $T_{OL}$ is 100 μm or more. Therefore, in the multilayer capacitor C1, an electron tends not to be supplied from the internal electrodes 7A and 9A to the metal ion. Consequently, the multilayer capacitor C1 reliably controls the occurrence of the migration.

In a configuration in which the distance $T_{OL}$ is greater than 400 μm, cracks tend to be generated in the element body 3. In the multilayer capacitor C1, the distance $T_{OL}$ is 400 μm or less. Therefore, the multilayer capacitor C1 prevents cracks from being generated in the element body 3.

An electric field tends to be generated between the internal electrode 7A and the second electrode layer E2 included in the electrode portion 5a that is not electrically connected to the internal electrode 7A. In this case, the generated electric field acts on the metal particle included in the second electrode layer E2, so that the metal particle tends to be ionized.

In the multilayer capacitor C1, the film portion EIa is located between the internal electrode 7A and the second electrode layer E2 included in the electrode portion 5a that is not electrically connected to the internal electrode 7A. Therefore, an electric field tends not to be generated between the internal electrode 7A and the second electrode layer E2 included in the electrode portion 5a that is not electrically connected to the internal electrode 7A.

In the multilayer capacitor C1, the film portion EIa is located between the internal electrode 9A and the second electrode layer E2 included in the electrode portion 5a that is not electrically connected to the internal electrode 9A. Therefore, an electric field tends not to be generated between the internal electrode 9A and the second electrode layer E2 included in the electrode portion 5a that is not electrically connected to the internal electrode 9A.

Consequently, the multilayer capacitor C1 further controls the occurrence of the migration.

An electric field tends to be generated between the internal electrode 7 and the second electrode layer E2 included in the electrode portion 5c that is not electrically connected to the internal electrode 7. Similarly, an electric field tends to be generated between the internal electrode 9 and the second electrode layer E2 included in the electrode portion 5c that is not electrically connected to the internal electrode 9. In either case, the generated electric field acts on the metal particle included in the second electrode layer E2, so that the metal particle tends to be ionized.

In the multilayer capacitor C1, the film portion EIc is located between the internal electrode 7 and the second electrode layer E2 included in the electrode portion 5c that is not electrically connected to the internal electrode 7. Therefore, an electric field tends not to be generated between the internal electrode 7 and the second electrode layer E2 included in the electrode portion 5c that is not electrically connected to the internal electrode 7.

In the multilayer capacitor C1, the film portion EIc is located between the internal electrode 9 and the second electrode layer E2 included in the electrode portion 5c that is not electrically connected to the internal electrode 9. Therefore, an electric field tends not to be generated between the internal electrode 9 and the second electrode layer E2 included in the electrode portion 5c that is not electrically connected to the internal electrode 9.

Consequently, the multilayer capacitor C1 further controls the occurrence of the migration.

In the multilayer capacitor C1, the external electrode 5 includes the third electrode layer E3, and the third electrode layer E3 covers the second electrode layer E2. Therefore, even when the metal particle included in the second electrode layer E2 is ionized, the third electrode layer E3 controls the occurrence of the migration. Consequently, the multilayer capacitor C1 further controls the occurrence of the migration.

In the multilayer capacitor C1, the third electrode layer E3 prevents the second electrode layer E2 from peeling off.

In the multilayer capacitor C1, the electrical insulating film EI and the second electrode layer E2 are in contact with each other. Therefore, the multilayer capacitor C1 reliably prevents the electron from being supplied to the metal ion. The multilayer capacitor C1 reliably controls the occurrence of the migration.

In the multilayer capacitor C1, the electrical insulating film EI includes a silicon oxide film.

The silicon oxide film has a high electrical insulation property. Silver tends not to diffuse into the silicon oxide film. Therefore, even in a configuration in which the second electrode layer E2 includes the plurality of silver particles, the electrical insulating property of the electrical insulating film EI can be maintained.

Consequently, the multilayer capacitor C1 reliably controls the occurrence of the migration.

The second electrode layer E2 includes the plurality of silver particles. The silver particles tend to cause migration than, for example, copper particles.

The multilayer capacitor C1 reliably controls the occurrence of the migration even when the second electrode layer E2 includes the plurality of silver particles.

Figure 9:
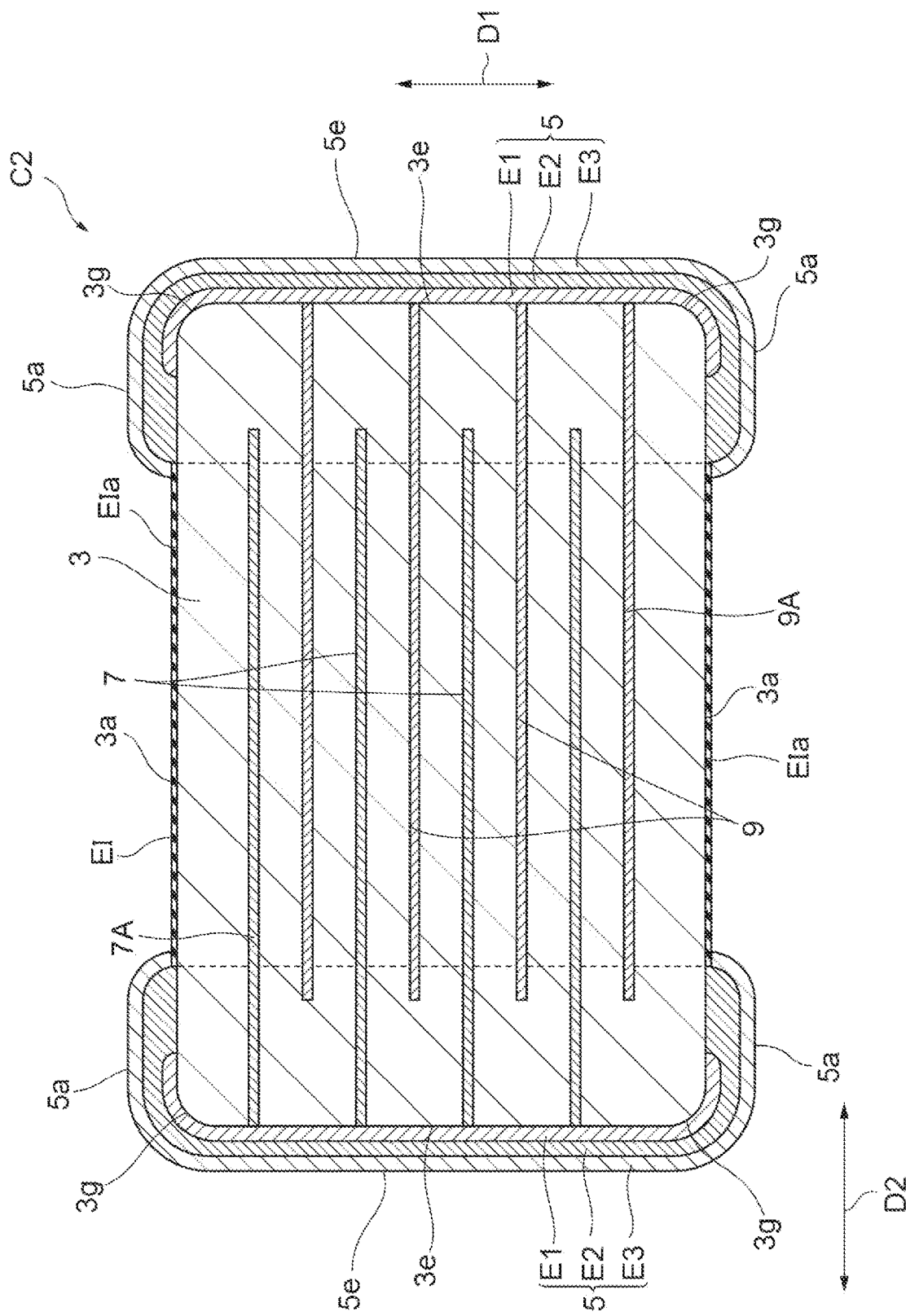
FIG. 9 is a view illustrating a cross-sectional configuration of a multilayer capacitor according to a modification of the embodiment.
Figure 10:
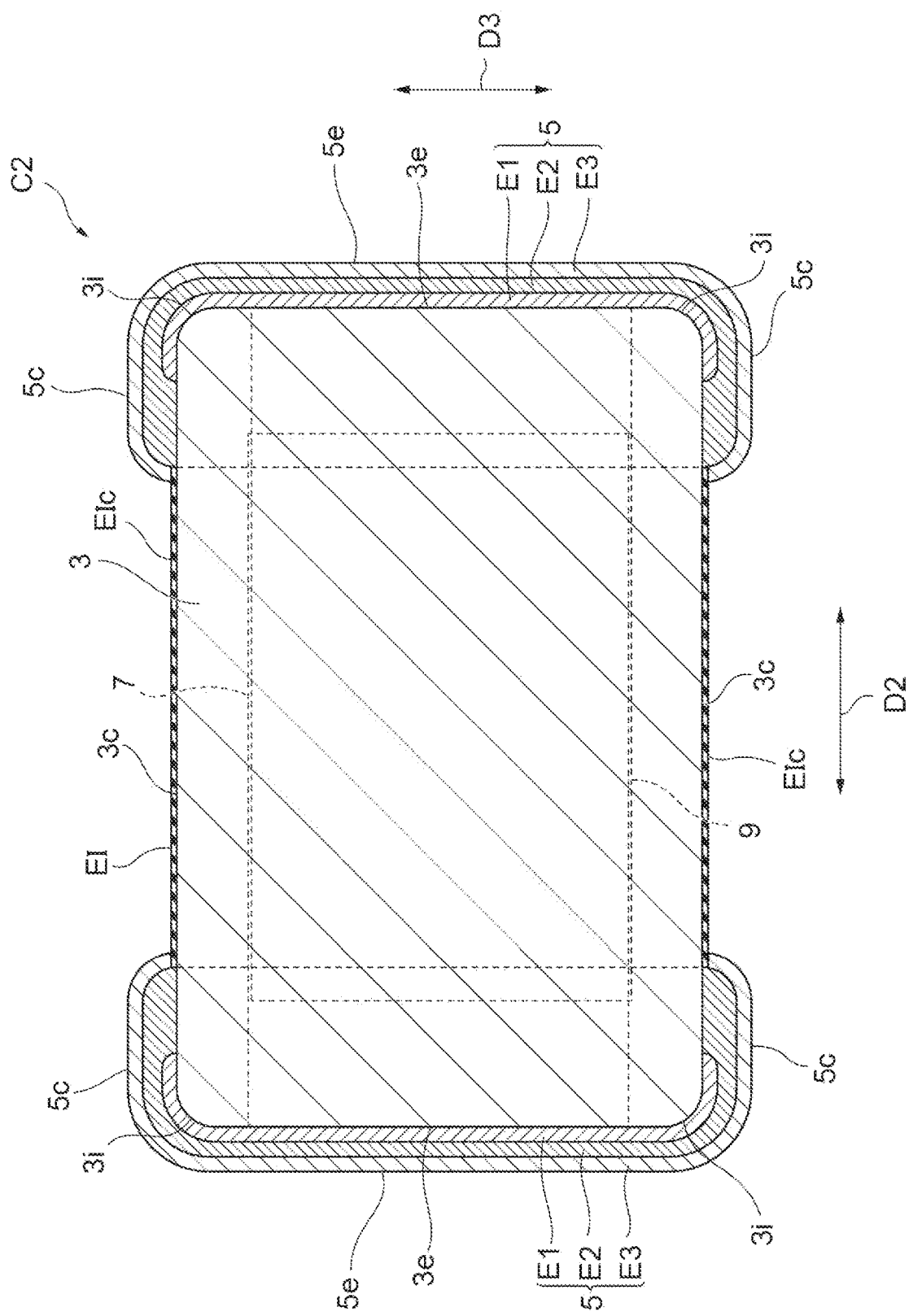
FIG. 10 is a view illustrating a cross-sectional configuration of a multilayer capacitor according to the modification of the embodiment.

Next, a configuration of a multilayer capacitor C2 according to a modification of the embodiment will be described with reference to FIGS. 9 and 10. FIGS. 9 and 10 are views illustrating a cross-sectional configuration of a multilayer capacitor according to the modification of the embodiment. The multilayer capacitor C2 according to this modification is generally similar to or the same as the multilayer capacitor C1 described above. However, this modification is different from the above-described first embodiment in a configuration of the external electrodes 5 and the electrical insulating film EI. Hereinafter, differences between the above-described embodiment and this modification will be mainly described.

As illustrated in FIGS. 9 and 10, the external electrodes 5 are disposed directly on the element body 3. The external electrodes 5 are formed on the element body 3 to cover the five surfaces of the pair of side surfaces 3a, the end surface 3e, and the pair of side surfaces 3c and the ridge portions 3g, 3i, and 3j.

The first electrode layer E1 of the electrode portion 5a is formed on the element body 3 to cover a part of the side surfaces 3a and the entire ridge portion 3g. The first electrode layer E1 of the electrode portion 5a is in contact with the element body 3 on the above-described part of the side surfaces 3a and on the entire ridge portion 3g. In the electrode portion 5a, the first electrode layer E1 is in direct contact with the element body 3. The side surfaces 3a is directly covered with the first electrode layer E1 at the above-described part, and is exposed from the first electrode layer E1 at the remaining part except the above-described part.

In the electrode portion 5a, the second electrode layer E2 is formed on the first electrode layer E1 and the element body 3 to cover the first electrode layer E1 and a part of the side surface 3a. In the electrode portion 5a, the second electrode layer E2 is in direct contact with the first electrode layer E1 and the element body 3. In the electrode portion 5a, the second electrode layer E2 indirectly covers the side surface 3a in such a manner that the first electrode layer E1 is located between the second electrode layer E2 and the side surface 3a. In the electrode portion 5a, the second electrode layer E2 directly covers the side surface 3a.

The first electrode layer E1 of the electrode portion 5c is formed on the element body 3 to cover a part of the side surface 3c and the entire ridge portion 3i. The first electrode layer E1 of the electrode portion 5c is in contact with the element body 3 on the above-described part of the side surface 3c and on the entire ridge portion 3i. In the electrode portion 5c, the first electrode layer E1 is in direct contact with the element body 3. The side surface 3c is directly covered with the first electrode layer E1 at the above-described part, and is exposed from the first electrode layer E1 at the remaining part except the above-described part.

In the electrode portion 5c, the second electrode layer E2 is formed on the first electrode layer E1 and the element body 3 to cover the first electrode layer E1 and a part of the side surface 3c. In the electrode portion 5c, the second electrode layer E2 is in direct contact with the first electrode layer E1 and the element body 3. In the electrode portion 5c, the second electrode layer E2 indirectly covers the side surface 3c in such a manner that the first electrode layer E1 is located between the second electrode layer E2 and the side surface 3c. In the electrode portion 5c, the second electrode layer E2 directly covers the side surface 3c.

As illustrated in FIGS. 9 and 10, the electrical insulating film EI includes a plurality of film portions EIa and EIc. The electrical insulating film EI includes a pair of film portions EIa and a pair of film portions EIc. In this modification, the electrical insulating film EI does not include the film portion EIe. The end surface 3e is exposed from the electrical insulating film EI. The electrical insulating film EI includes a plurality of film portions respectively disposed on each ridge portion 3j. The film portion EIa and the film portion EIc are coupled to each other by the film portion disposed on the ridge portion 3j.

The film portion EIa is disposed on a region included in the side surface 3a and exposed from the second electrode layer E2 included in the electrode portion 5a. The film portion EIa does not include a portion covered with the second electrode layer E2 included in the electrode portion 5a. The film portion EIa includes only the region exposed from the second electrode layer E2 included in the electrode portion 5a. The film portion EIa may be in contact with the second electrode layer E2 or may be separated from the second electrode layer E2.

The film portion EIc is disposed on a region included in the side surface 3c and exposed from the second electrode layer E2 included in the electrode portion 5c. The film portion EIc does not include a portion covered with the second electrode layer E2 included in the electrode portion 5c. The film portion EIc includes only the region exposed from the second electrode layer E2 included in the electrode portion 5c. The film portion EIc may be in contact with the second electrode layer E2 or may be separated apart from the second electrode layer E2.

Also in the multilayer capacitor C2, the film portion EIa is located at least on a region between the plurality of external electrodes 5 on the surface of the element body 3. Therefore, the multilayer capacitor C2 controls occurrence of migration as described above.

The film portion EIc is also located at least on a region between the plurality of external electrodes 5 on the surface of the element body 3. Therefore, the multilayer capacitor C2 further controls the occurrence of the migration as described above.

In the present specification, in a case where an element is described as being disposed on another element, the element may be directly disposed on the other element or be indirectly disposed on the other element. In a case where an element is indirectly disposed on another element, an intervening element is present between the element and the other element. In a case where an element is directly disposed on another element, no intervening element is present between the element and the other element.

In the present specification, in a case where an element is described as being located on another element, the element may be directly located on the other element or be indirectly located on the other element. In a case where an element is indirectly located on another element, an intervening element is present between the element and the other element. In a case where an element is directly located on another element, no intervening element is present between the element and the other element.

In the present specification, in a case where an element is described as covering another element, the element may directly cover the other element or indirectly cover the other element. In a case where an element indirectly covers another element, an intervening element is present between the element and the other element. In a case where an element directly covers another element, no intervening element is present between the element and the other element.

Although the embodiment and modifications of the present invention have been described above, the present invention is not necessarily limited to the embodiment and modifications, and the embodiment can be variously changed without departing from the scope of the invention.

In the present embodiment and modification, electronic components are the multilayer capacitors C1 and C2. However, applicable electronic component is not limited to the multilayer capacitor. The applicable electronic component includes, for example, a multilayer electronic component such as a multilayer inductor, a multilayer varistor, a multilayer piezoelectric actuator, a multilayer thermistor, or a multilayer composite component, or electronic components other than the multilayer electronic components.

What is claimed is:

1. An electronic component, comprising:
   an element body;
   a plurality of external electrodes on the element body; and
   an electrical insulator on the element body, the electrical insulator being in direct contact with the element body,
   wherein each of the plurality of external electrodes includes a sintered metal layer disposed on the element body and in direct contact with the element body, and a conductive resin layer disposed on the sintered metal layer and in direct contact with the sintered metal layer, and the electrical insulator includes an electrical insulating portion located at least on a region between the plurality of external electrodes on a surface of the element body, and the electrical insulating portion is not in contact with the sintered metal layer.

2. The electronic component according to claim 1, further comprising:

a plurality of internal electrodes disposed in the element body to oppose each other, each of the plurality of internal electrodes being electrically connected to a corresponding external electrode of the plurality of external electrodes, wherein the plurality of internal electrodes include an outermost internal electrode located on an outermost side in a direction in which the plurality of internal electrodes oppose each other, the element body includes a first side surface opposing the outermost internal electrode, the conductive resin layer includes a portion located on the first side surface, and the electrical insulating portion is located on the first side surface.

3. The electronic component according to claim 2, wherein the element body further includes a second side surface extending in the direction in which the plurality of internal electrodes oppose each other, the conductive resin layer includes a portion located on the second side surface, and the electrical insulating portion is located on the second side surface.

4. The electronic component according to claim 2, wherein the element body further includes an end surface to which a corresponding internal electrode of the plurality of internal electrodes is exposed, the end surface is exposed from the electrical insulator, and the sintered metal layer includes a portion that is disposed on the end surface and is physically and electrically connected to the corresponding internal electrode.

5. The electronic component according to claim 4, wherein an average thickness of the electrical insulating portion located on the first side surface is equal to or greater than an average thickness of the electrical insulating portion located on the end surface.

6. The electronic component according to claim 5, wherein the average thickness of the electrical insulating portion located on the first side surface is 0.05 μm or more.

7. The electronic component according to claim 5, wherein the average thickness of the electrical insulating portion located on the end surface is greater than 0 and 0.2 μm or less.

8. The electronic component according to claim 5, wherein a distance between the outermost internal electrode and the first side surface is 100 μm or more and 400 μm or less.

9. The electronic component according to claim 2, wherein the outermost internal electrode is not electrically connected to the portion included in the conductive resin layer and located on the first side surface, and the electrical insulating portion located on the first side surface is further located between the outermost internal electrode and the portion included in the conductive resin layer and located on the first side surface.

10. The electronic component according to claim 1, wherein each of the plurality of external electrodes further includes a plating layer disposed on the conductive resin layer to cover the conductive resin layer.

11. The electronic component according to claim 1, wherein the electrical insulator and the conductive resin layer are in contact with each other.

12. The electronic component according to claim 1, wherein the electrical insulator includes an electrical insulating thin film.

13. The electronic component according to claim 1, wherein the electrical insulator includes a silicon oxide film.

14. The electronic component according to claim 1, wherein the conductive resin layer includes a plurality of silver particles.

15. The electronic component according to claim 11, wherein the electrical insulating thin film includes a sputtered film.

16. An electronic component, comprising:

an element body including a first side surface and a pair of end surfaces that are adjacent the first side surface and oppose each other, a plurality of external electrodes on the element body;

a plurality of internal electrodes disposed in the element body to oppose each other, each of the plurality of internal electrodes being electrically connected to a corresponding external electrode of the plurality of external electrodes; and an electrical insulator on the element body, wherein the plurality of internal electrodes include an outermost internal electrode located on an outermost side in a direction in which the plurality of internal electrodes oppose each other, the outermost internal electrode opposing the first side surface, each of the plurality of external electrodes includes a conductive resin layer including a portion located on the first side surface, the electrical insulator includes an electrical insulating portion located at least on a region between the plurality of external electrodes on the first side surface, a ratio of an average thickness of the electrical insulating portion to a distance between the outermost internal electrode and the first side surface is $1.0 \times 10^{-4}$ or more, a ratio of the average thickness to a maximum thickness of the portion on the first side surface is $6.67 \times 10^{-4}$ or more, and a ratio of the average thickness to a length of the portion on the first side surface in a direction in which the pair of end surfaces oppose each other is $8.0 \times 10^{-5}$ or more.

17. The electronic component according to claim 16, wherein the element body further includes a second side surface extending in the direction in which the plurality of internal electrodes oppose each other, the conductive resin layer includes a portion located on the second side surface, and the electrical insulating portion is located on the second side surface.

18. The electronic component according to claim 16, wherein the element body further includes an end surface to which a corresponding internal electrode of the plurality of internal electrodes is exposed, and the electrical insulator further includes an electrical insulating portion located on the end surface.

19. The electronic component according to claim 18,
wherein each of the plurality of external electrodes further includes a sintered metal layer that is disposed on the electrical insulator and is physically and electrically connected to the corresponding internal electrode, and
the conductive resin layer is disposed on the sintered metal layer.

20. The electronic component according to claim 19, wherein an average thickness of the electrical insulating portion located on the first side surface is equal to or greater than an average thickness of the electrical insulating portion located on the end surface.

21. The electronic component according to claim 20, wherein the average thickness of the electrical insulating portion located on the first side surface is 0.05 µm or more.

22. The electronic component according to claim 20, wherein the average thickness of the electrical insulating portion located on the end surface is greater than 0 and 0.2 µm or less.

23. The electronic component according to claim 20, wherein a distance between the outermost internal electrode and the first side surface is 100 µm or more and 400 µm or less.

24. The electronic component according to claim 16, wherein the outermost internal electrode is not electrically connected to the portion included in the conductive resin layer and located on the first side surface, and
the electrical insulating portion located on the first side surface is further located between the outermost internal electrode and the portion included in the conductive resin layer and located on the first side surface.

25. The electronic component according to claim 16, wherein each of the plurality of external electrodes further includes a plating layer disposed on the conductive resin layer to cover the conductive resin layer.

26. The electronic component according to claim 16, wherein the electrical insulator and the conductive resin layer are in contact with each other.

27. The electronic component according to claim 16, wherein the electrical insulator includes an electrical insulating thin film.

28. The electronic component according to claim 16, wherein the electrical insulator includes a silicon oxide film.

29. The electronic component according to claim 16, wherein the conductive resin layer includes a plurality of silver particles.

30. The electronic component according to claim 16, wherein the electrical insulating thin film includes a sputtered film.

31. The electronic component according to claim 16, wherein each of the plurality of external electrodes includes an electrode portion located on the first side surface and a ridge portion between the first side surface and a corresponding end surface of the pair of end surfaces, the electrode portion including the conductive resin layer and a sintered metal layer between the conductive resin layer and the element body, and
the length is defined by a distance in the direction between an edge of the conductive resin layer of the electrode portion and an edge of the sintered metal layer of the electrode portion.

* * * * *